US012280612B2

(12) United States Patent
Moure Arroyo et al.

(10) Patent No.: US 12,280,612 B2
(45) Date of Patent: Apr. 22, 2025

(54) RAMAN MARKERS

(71) Applicants: FÁBRICA NACIONAL DE MONEDA Y TIMBRE—REAL CASA DE LA MONEDA, Madrid (ES); CONSEJO SUPERIOR DE INVESTIGACIONES CIENTÍFICAS, Madrid (ES)

(72) Inventors: Alberto Moure Arroyo, Madrid (ES); José Francisco Fernández Lozano, Madrid (ES); Victor Fuertes De La Llave, Madrid (ES); Esther Enríquez Pérez, Madrid (ES); Vicente García Juez, Madrid (ES)

(73) Assignees: FÁBRICA NACIONAL DE MONEDA Y TIMBRE—REAL CASA DE LA MONEDA (ES); CONSEJO SUPERIOR DE INVESTIGACIONES CIENTÍFICAS (ES)

( * ) Notice: Subject to any disclaimer, the term of this patent is extended or adjusted under 35 U.S.C. 154(b) by 869 days.

(21) Appl. No.: 17/424,966

(22) PCT Filed: Jan. 21, 2020

(86) PCT No.: PCT/EP2020/051404
§ 371 (c)(1),
(2) Date: Jul. 22, 2021

(87) PCT Pub. No.: WO2020/152160
PCT Pub. Date: Jul. 30, 2020

(65) Prior Publication Data
US 2022/0097439 A1  Mar. 31, 2022

(30) Foreign Application Priority Data
Jan. 22, 2019 (EP) .................................. 19382045

(51) Int. Cl.
C03C 10/00 (2006.01)
B42D 25/415 (2014.01)
(Continued)

(52) U.S. Cl.
CPC ........ *B42D 25/415* (2014.10); *C03C 10/0018* (2013.01); *C03C 14/004* (2013.01);
(Continued)

(58) Field of Classification Search
CPC ............ C03C 10/0018; C03C 10/0027; C03C 10/0036; C03C 10/0045; B42D 25/00;
(Continued)

(56) References Cited

U.S. PATENT DOCUMENTS 5,324,567 A   6/1994  Bratchley et al.
5,718,754 A   2/1998  Macpherson et al.
(Continued)

FOREIGN PATENT DOCUMENTS

EP   2714419        12/2012
JP   H11256151 A    9/1999
(Continued)

OTHER PUBLICATIONS

Partyka, Janusz, Ceramics International, Effect of BaO ratio on the structure of glass-ceramic composite materials from the SiO2-Al2O3-Na2O-K2O-CaO system, 2015, vol. 41, n° 8, p. 9337-9343.
(Continued)

*Primary Examiner* — Matthew E. Hoban
(74) *Attorney, Agent, or Firm* — Casimir Jones, S.C.; Tristan A. Fuierer

(57) ABSTRACT

The present invention relates to a security marker; a method of preparing same; the use of said security marker; a security article, document, or element comprising said marker; the use of said security article, document, or element; an object of value comprising said marker; a method of preparing said
(Continued)

Figure 1:
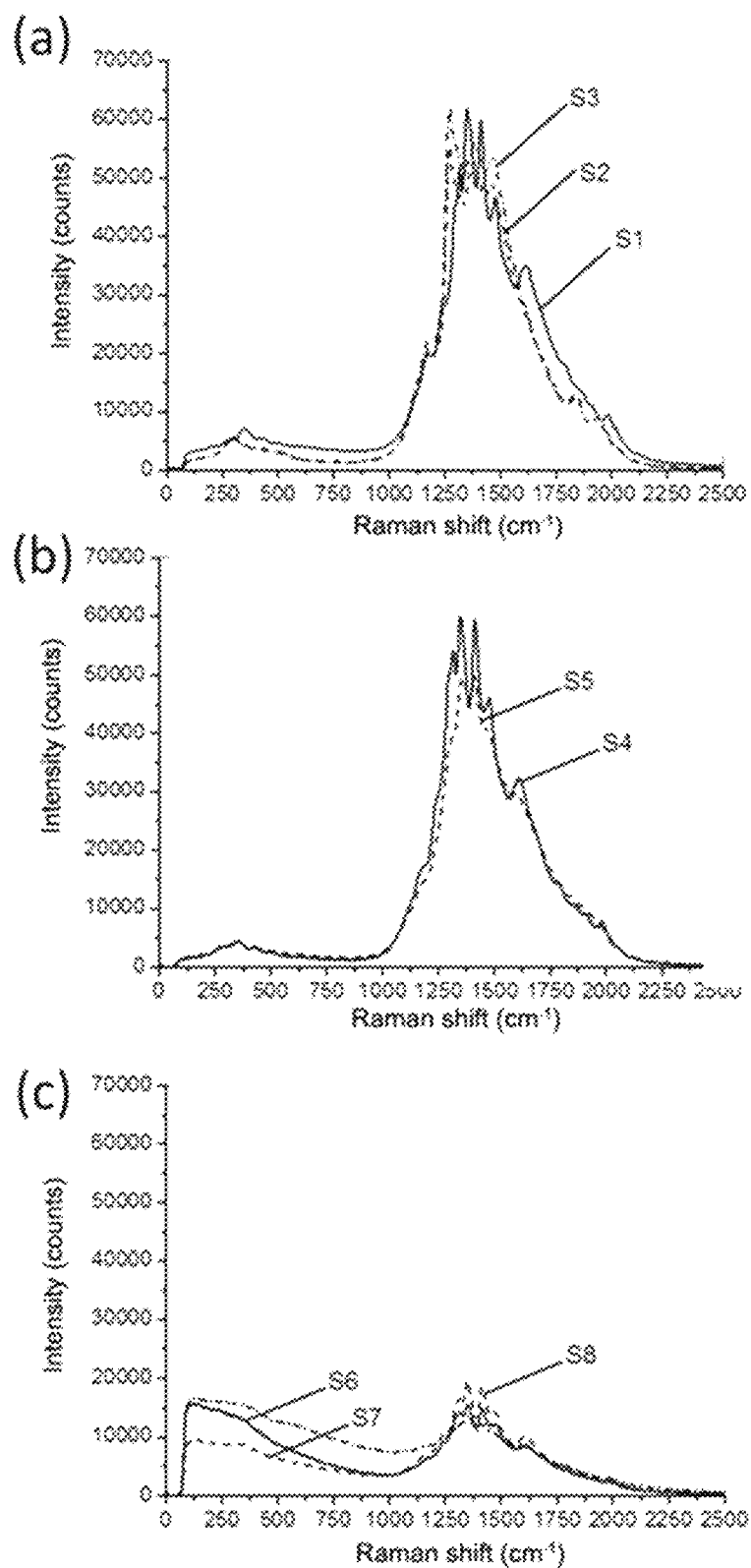

security article, document, or element or said object of value; a method for determining the authenticity of said security article, document, or element or said object of value; and a system for determining the authenticity of said security article, document, or element or said object of value.

19 Claims, 16 Drawing Sheets

(51) Int. Cl.
  *C03C 14/00* (2006.01)
  *G01N 21/65* (2006.01)
  *G07D 7/12* (2016.01)
  *G07D 7/1205* (2016.01)
  *G07D 7/202* (2016.01)

(52) U.S. Cl.
  CPC ........... *G01N 21/65* (2013.01); *G07D 7/1205* (2017.05); *G07D 7/205* (2013.01)

(58) Field of Classification Search
  CPC ........ B42D 25/30; B42D 25/415; G07D 7/12; G07D 7/205; G07D 7/1205
  See application file for complete search history.

(56) References Cited

U.S. PATENT DOCUMENTS

| | | | |
|---|---|---|---|
| 9,196,107 B2 * | 11/2015 | Romero Fanego | G01N 21/65 |
| 9,776,450 B2 * | 10/2017 | Giering | B42D 25/00 |
| 2015/0185156 A1 | 7/2015 | Mirkin et al. | |

FOREIGN PATENT DOCUMENTS

| | | |
|---|---|---|
| JP | 2003261353 A * | 9/2003 |
| RU | 2450358 | 5/2012 |
| RU | 2607816 | 1/2017 |
| WO | 2010/135351 A1 | 11/2010 |
| WO | 2012/164054 A1 | 12/2012 |
| WO | WO 2017118467 | 7/2017 |
| WO | WO 2018/001942 | 1/2018 |
| WO | WO 2018/007444 | 1/2018 |

OTHER PUBLICATIONS

Partyka, J., Effect of BaO addition on the structure and microstructure of $SiO_2$—$Al_2O_3$—$Na_2O$—$K_2O$—$MgO$ glass-ceramic composites, Ceramics International, 2015, vol. 41, n° 10, p. 14013-14020.
H. Moertel, et al., Memory effects of raw materials in glass melts. Raman spectroscopy investigations of glass defects, Glastech. Ber. Glass Science and Technology, 1997, vol. 70, n° 3, p. 67-75.
Renan Belli, et al., Chairside CAD/CAM materials. Part 1: Measurement of elastic constants and microstructural characterization, Dental Materials, 2017, vol. 33, n° 1, pp. 84-98.
Fernanda A.N.G. da Silva, et al., Preparation and Mechanical Behavior of Glass-Ceramics from Feldspathic Frits, Journal of Materials Engineering and Performance, 2017, vol. 26, n° 10, p. 5027-5031.
International Search Report for PCT/EP2020/051404 dated May 4, 2020.
Kiselev V.M. et al., Polzunovsky Vestnik, 2012, 2, pp. 44-48. Only Abstract in English.
https://dic.academic.ru/dic.nsf/lower/14965 (published on Mar. 10, 2013).

* cited by examiner

RAMAN MARKERS

CROSS-REFERENCE TO RELATED APPLICATIONS

This application is filed under the provisions of 35 U.S.C. § 371 and claims the priority of International Patent Application No. PCT/EP2020/051404 filed on 21 Jan. 2021 entitled "RAMAN MARKERS" in the name of Alberto MOURE ARROYO, et al., which claims priority to European Patent Application No. 19382045.3, filed on 22 Jan. 2019, both of which are hereby incorporated by reference herein in their entirety.

FIELD OF THE INVENTION

The present invention relates to the field of markers for the authentication or anti-counterfeiting of security documents, security articles, and objects of value. More specifically, the present invention relates to the field of Raman markers.

BACKGROUND

The use of different security elements to hinder document counterfeiting requires the use of special tools for their detection, such as for example spectroscopic methods such as UV-VIS absorption spectroscopy, fluorescence emission spectroscopy, IR spectroscopy, or Raman spectroscopy. To certifying the authenticity of security documents or articles, pigments or luminescent substances have been used. Nevertheless, these substances have restrictions due to their limited number of optical transitions (absorptions and emissions).

Raman spectroscopy is based on an inelastic scattering of a photon which is produced after strongly monochromatic light, such as laser radiation, strikes a material. Energy is therefore transferred between the incident light and the material such that the energy of the incident light experiences a change in energy defined as the Raman shift. The Raman shift provides information about the vibrational modes in a system. Raman signal intensity is proportional to the polarizability of the electrons in a crystalline structure or molecules. The Raman effect is a form of inelastic scattering of the photons exciting a sample. The Raman effect is seen in one of every $10^6$-$10^7$ photons reaching the sample, therefore it is an effect which requires a spectrometer for the determination thereof. Raman spectroscopy is used to identify the molecule and study intramolecular bonds. In solid-state physics it is used to determine the vibrational modes of solids.

Different organic compounds have been proposed as Raman markers, for example in patent documents U.S. Pat. No. 5,324,567 or U.S. Pat. No. 5,718,754. Nevertheless, the use of said organic compounds is not altogether safe, since the disclosure of their structure would allow reproducing them, rendering the system highly susceptible to being counterfeited, provided that the means suitable for the synthesis thereof are available. Patent document EP2714419 discloses a Raman marker combining two types of nanoparticles, the Raman shift of which is dependent on the agglomeration state of said nanoparticles, thereby allowing identification. Despite the difficulty in reproducing the specific agglomeration state, and hence Raman shift, markers based on the agglomeration state can be identified because the inorganic compound which forms them exhibits a characteristic Raman spectrum. Moreover, there are documents in the state of the art which describe active nuclei in Raman and a metallic coating, such as patent document WO2010/135351. Said metallic elements are used as Raman signal amplifiers, without any effect on the spectrum itself, so they do not entail an improvement as a security system, except the fact that they allow reducing the amount of active material.

Therefore, there is a clear need to develop new compositions and methods which hinder the counterfeiting of security documents.

BRIEF DESCRIPTION OF THE INVENTION

The authors of the present invention have developed a Raman security marker.

Therefore, a first aspect of the invention relates to a security marker obtainable by means of a method comprising the steps of:
  i. providing a mixture comprising:
     a. a source of silicon and oxygen;
     b. a source of aluminum; and
     c. a source of at least one element from the group consisting of Na, K, and Ca;
     wherein said sources (a, b, and c) come from the same material or from different materials;
  ii. optionally performing a mechanical treatment on the mixture of step (i) to yield a mixture;
  iii. performing a thermal treatment at a temperature comprised between 500° C. and 1500° C. for a period of time between 0.1 min and 50 h;
  wherein said security marker comprises:
  a glassy matrix comprising at least the elements silicon and oxygen; and
  a first crystalline phase formed by crystalline particles embedded in said matrix; wherein said particles are feldspars or feldspathoids; wherein the average size of said particles is less than 500 nm; and
  wherein an interface exists between the crystalline particles and the glassy matrix.

Another aspect of the invention relates to a security marker comprising:
  a glassy matrix comprising at least the elements silicon and oxygen; and
  a first crystalline phase formed by crystalline particles embedded in said matrix; wherein said particles are feldspars or feldspathoids; wherein the average size of said particles is less than 500 nm; and
  wherein an interface exists between the crystalline particles and the glassy matrix An additional aspect of the present invention relates to a method of preparing the security marker of the present invention comprising the steps of:
  i. providing a mixture comprising:
     a. a source of silicon and oxygen;
     b. a source of aluminum;
     c. a source of at least one element from the group consisting of Na, K, and Ca;
     wherein said sources (a, b, and c) come from the same material or from different materials;
  ii. optionally performing a mechanical treatment on the mixture of step (i) to yield a mixture; and
  iii. performing a thermal treatment at a temperature comprised between 500° C. and 1500° C. for a period of time between 0.1 min and 50 h on the mixture of (i) or (ii).

An additional aspect of the invention relates to the use of the security marker of the present invention for authenticating security elements, security documents, security articles, or objects of value.

An additional aspect relates to a security article, document, or element comprising the security marker of the present invention.

Another additional aspect relates to the use of the security article, document, or element of the present invention in the security sector.

An additional aspect relates to an object of value comprising the security marker of the present invention.

Another additional aspect relates to the method of preparing the security article, document, or element or the object of value defined in the present invention, said method comprises the incorporation of the security marker of the present invention; wherein said incorporation is performed:
- while manufacturing the material used for making the security article, document, or element or the object of value;
- as part of an additive added to the security article, document, or element or the object of value; or
- on the surface of said security article, document, or element or said object of value.

Another additional aspect relates to the method for determining the authenticity of a security article, document, or element or the object of value of the present invention, said method comprises:
  i. irradiating the security article, document, or element or the object of value with monochromatic laser radiation with a wavelength between 600 and 1100 nm; and
  ii. measuring the Raman spectrum of said security article, document, or element or the object of value to determine the presence of the security marker of the present invention.

Another additional aspect relates to a system for determining the authenticity of a security article, document, or element or the object of value of the present invention, which system comprises:
- a positioner in which the security article, document, or element or the object of value is placed;
- a lens array which allows focusing the light from an incident light laser beam on the part of the security article, document, or element or the object of value to be irradiated;
- a Raman spectrum multi-channel detector;
- a filter for blocking laser radiation reaching the multi-channel detector, and coming directly from the emitting laser source; and
- optionally, means adapted for processing the Raman spectrum; preferably for deconvoluting the signals of said spectrum.

DRAWINGS

FIG. 1: Raman spectra obtained for samples (a) S1-S3, (b) S4-S5, and (c) S6-S8.

Figure 2:
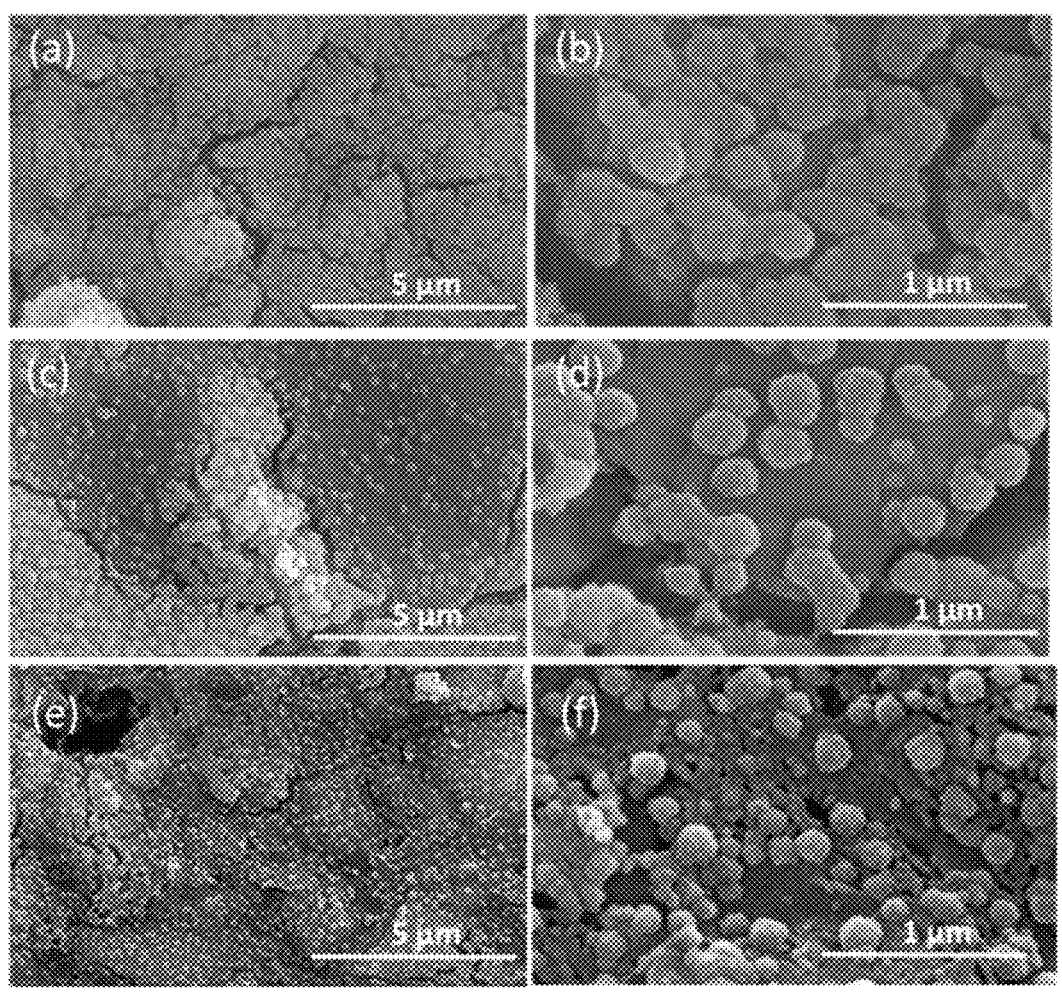

FIG. 2: Electron microscopy image for samples S1 in (a) and (b), S2 in (c) and (d), and S3 in (e) and (f).

Figure 3:
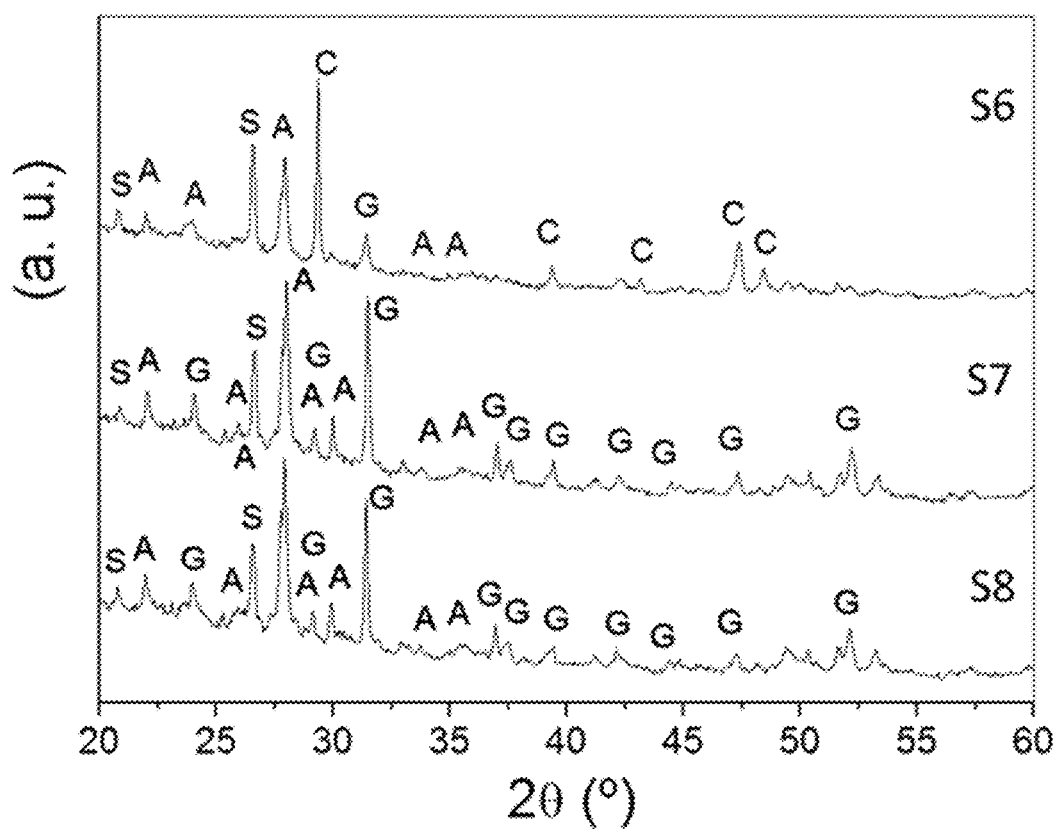

FIG. 3: Diffractograms for samples S6-S8.

Figure 4:
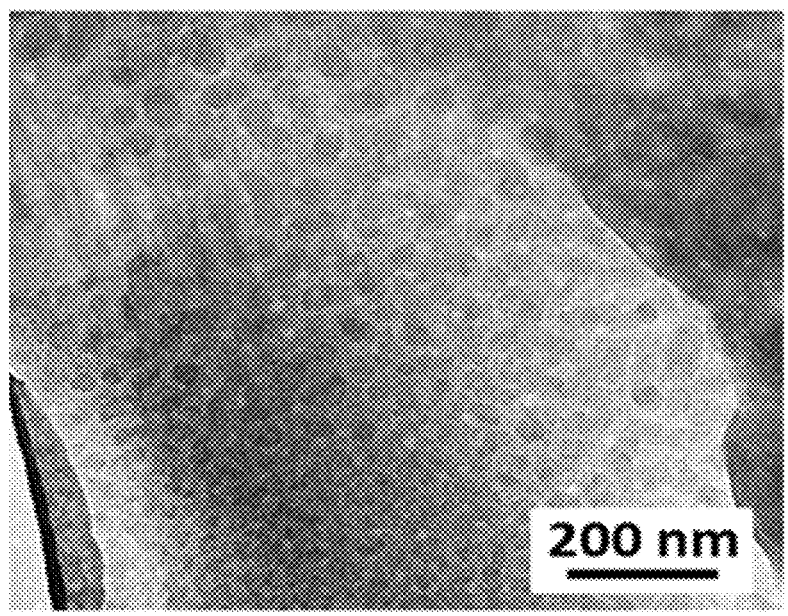

FIG. 4: Transmission electron microscopy micrograph of sample S10.

Figure 5:
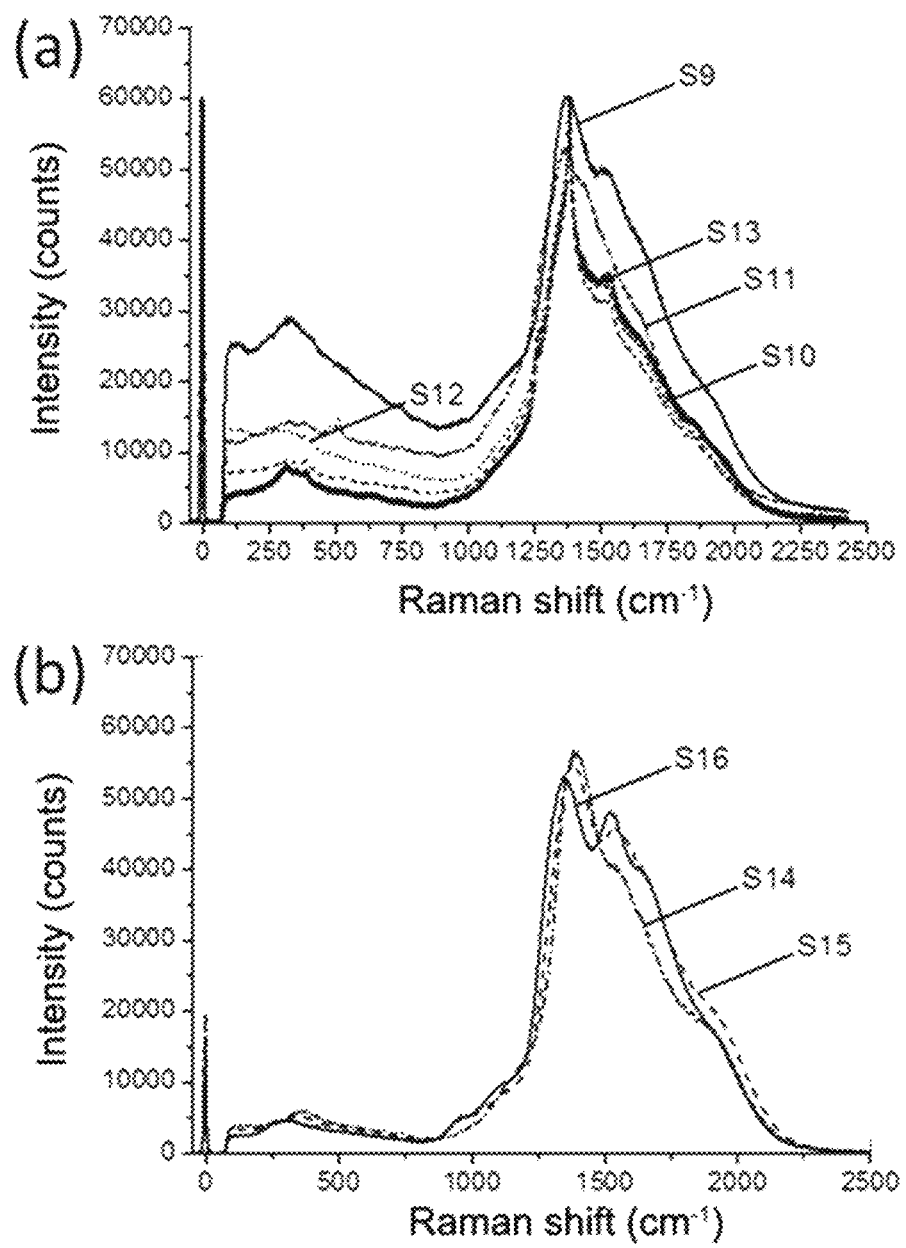

FIG. 5: Raman spectra obtained for samples (a) S9-S13 and (b) S14-S16.

Figure 6:
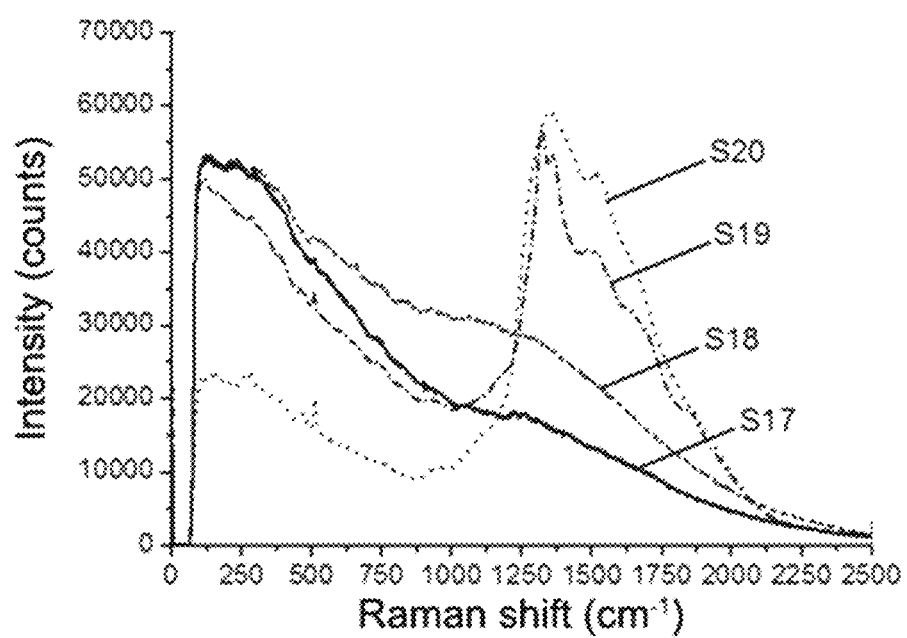

FIG. 6: Raman spectra obtained for samples S17-S20.

Figure 7:
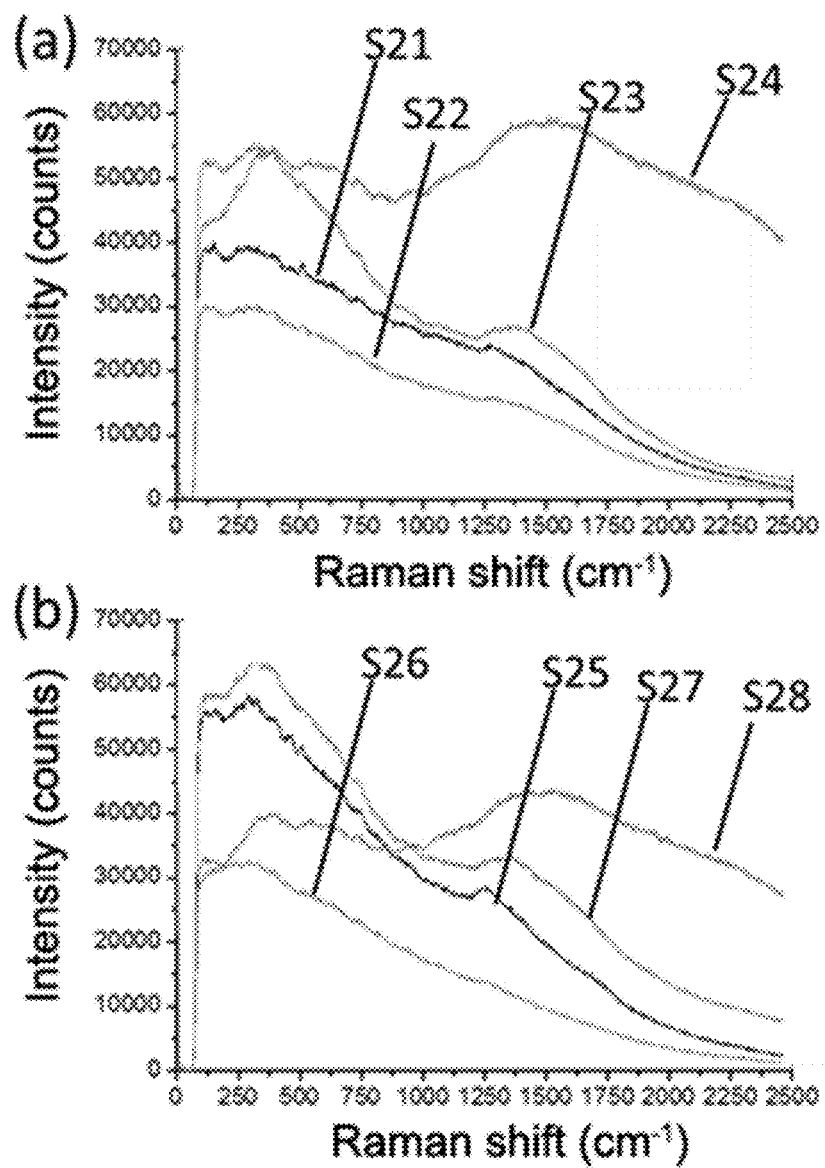

FIG. 7: Raman spectra obtained for milled samples during different times: S21-S24 in (a) and S25-S28 in (b).

Figure 8:
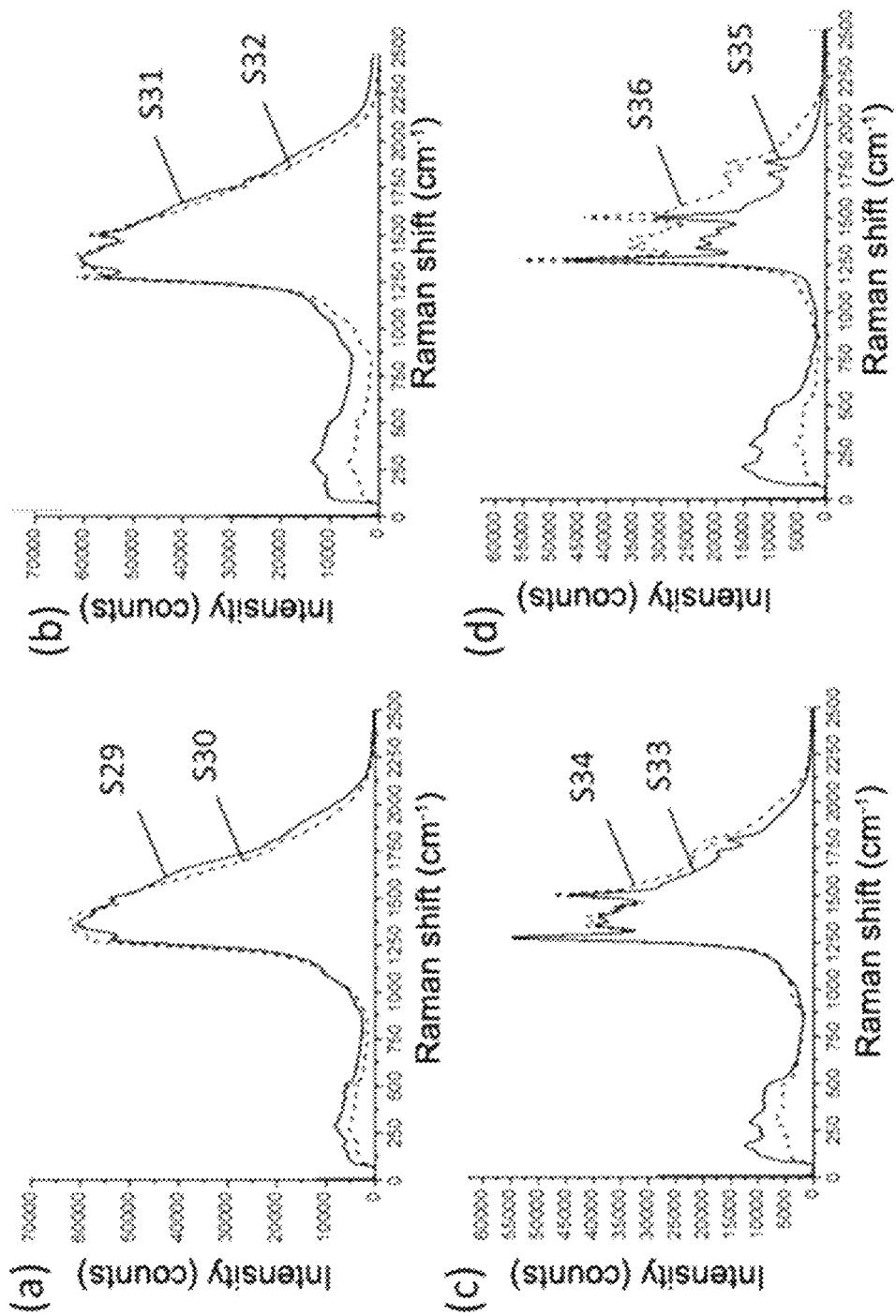

FIG. 8: Raman spectra obtained for samples (a) S29-S30, (b) S31-S32, (c) S33-S34, and (d) S35-S36.

Figure 9:
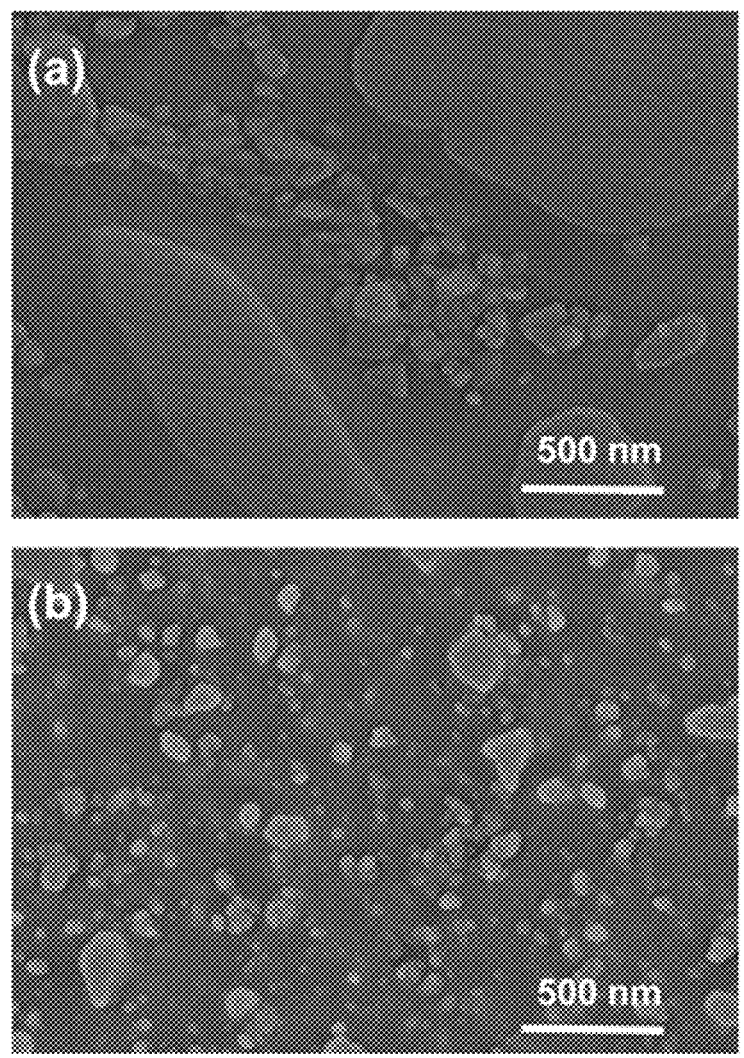

FIG. 9: Scanning electron microscopy micrograph for samples S32 in (a) and S36 in (b).

Figure 10:
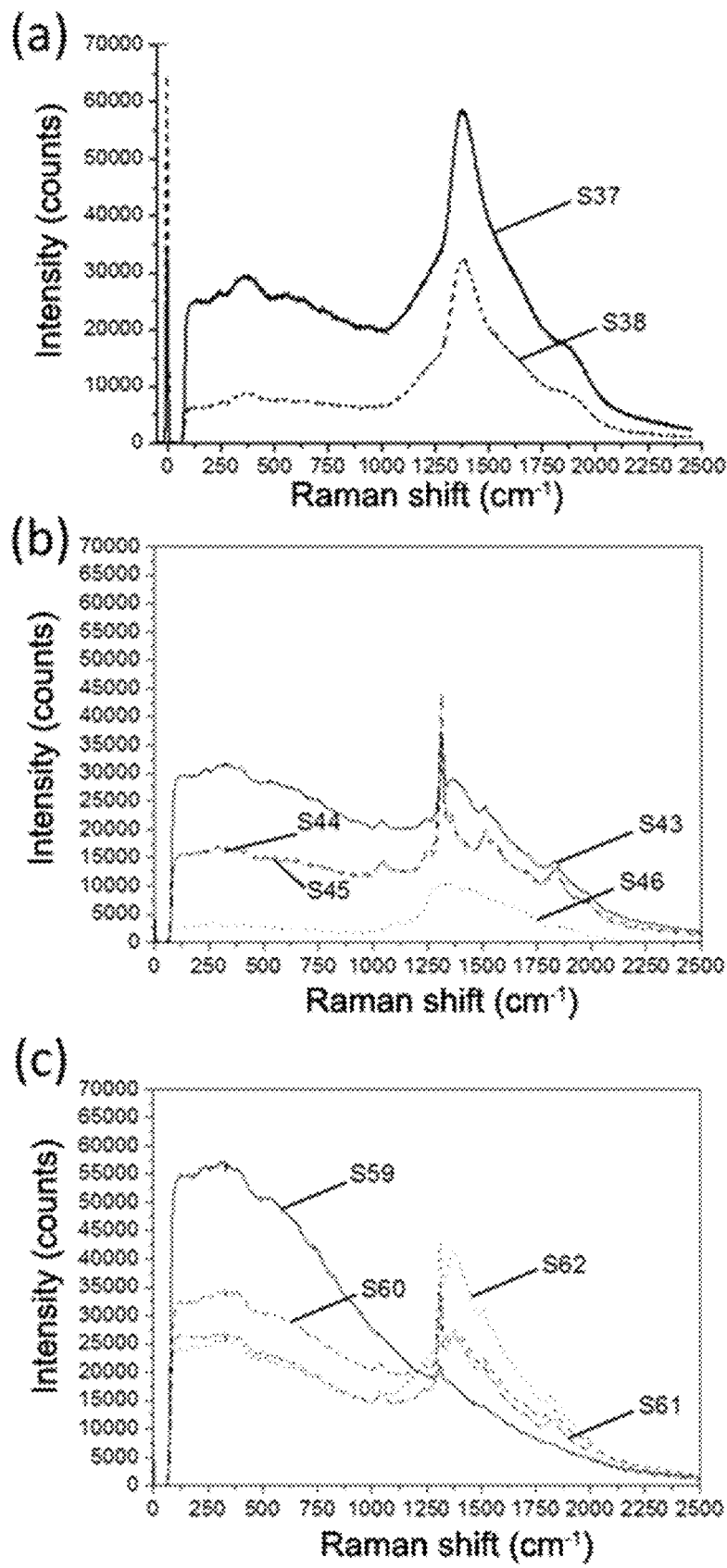

FIG. 10: Raman spectra obtained for samples (a) S37 and S38, (b) S43-S46, and (c) S59-S62.

Figure 11:
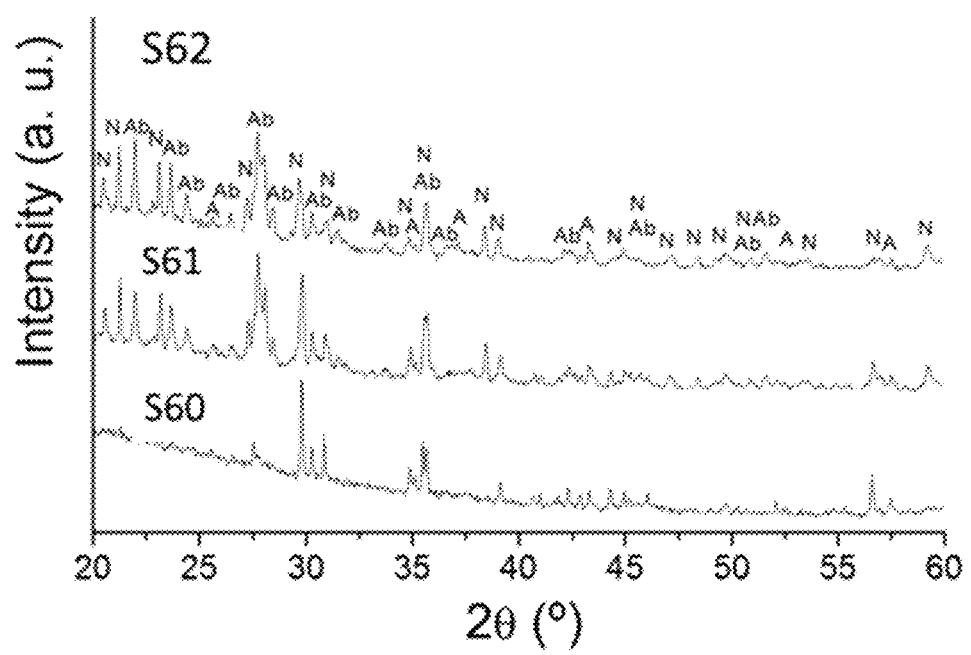

FIG. 11: X-ray diffractograms of samples S60-S62.

Figure 12:
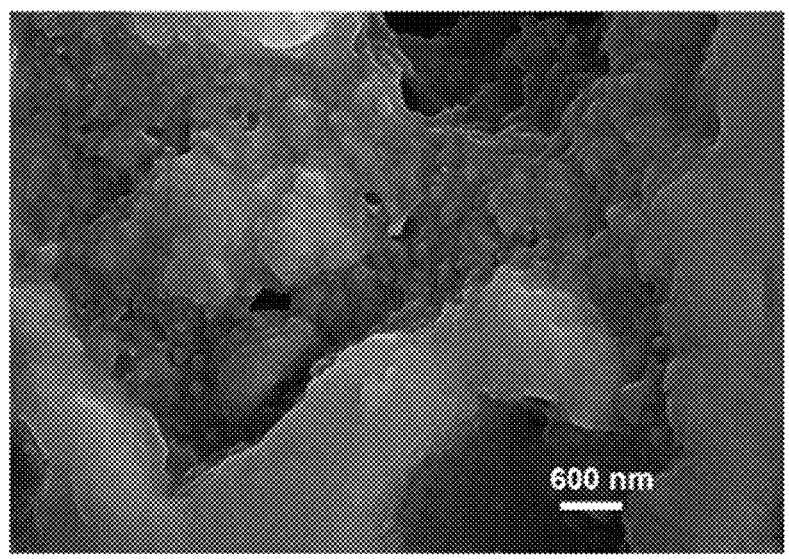

FIG. 12: Scanning microscopy micrograph of sample S61.

Figure 13:
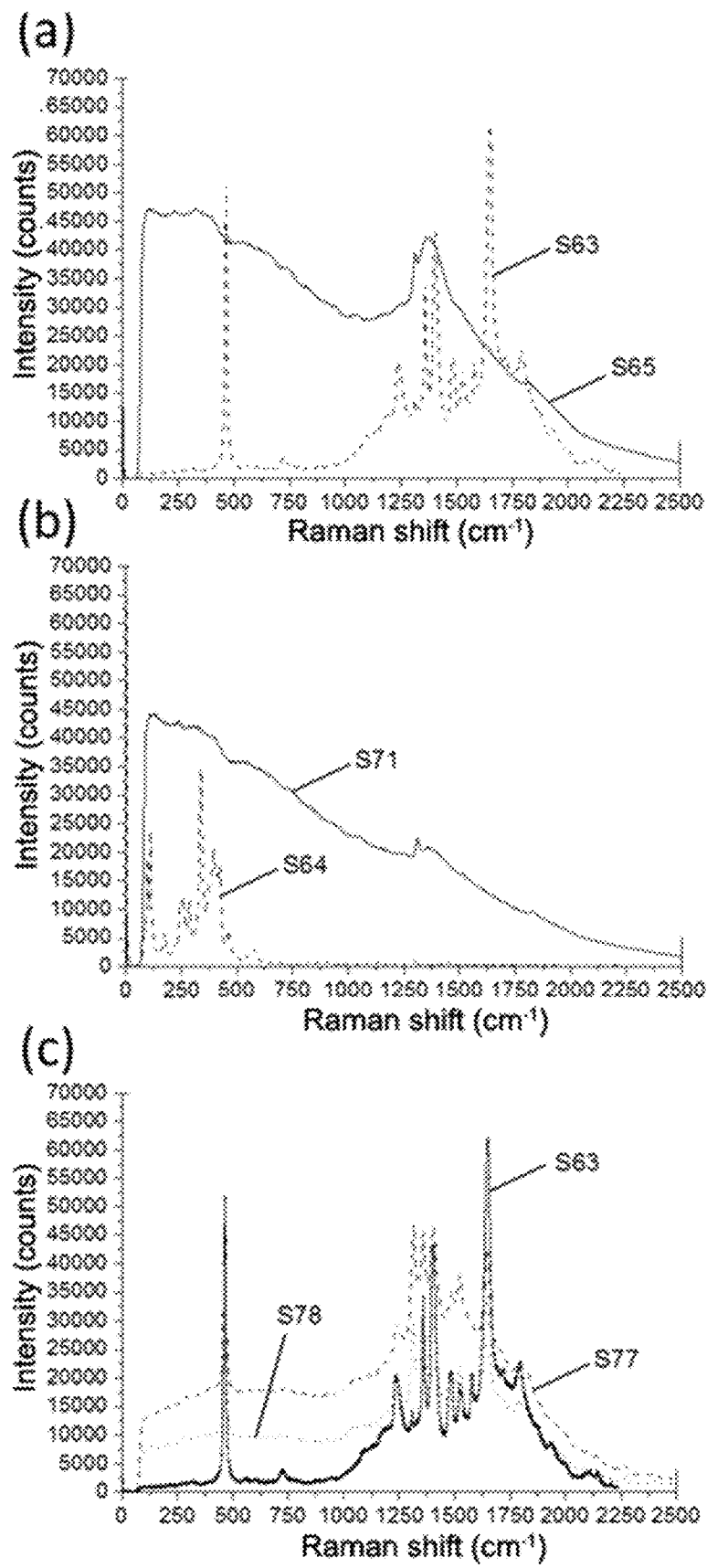

FIG. 13: Raman spectra obtained for samples: (a) S63-65, (b) S64 and S71, and (c) S63 and S77-S78.

Figure 14:
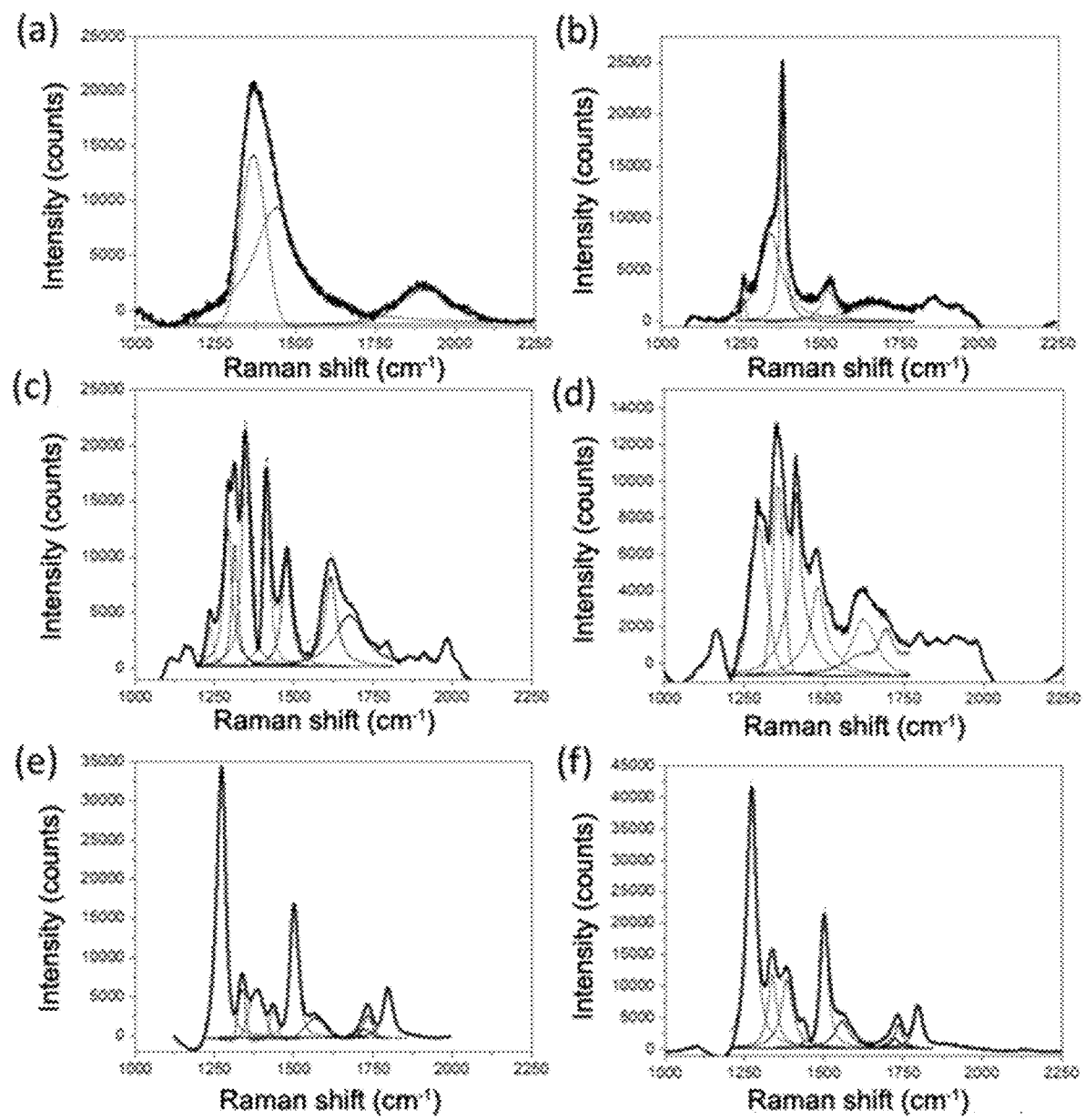

FIG. 14: Deconvoluted Raman spectra for samples: (a) S38, (b) S11 (c) S1 (d) S4, (d) S35, and (f) S36.

Figure 15:
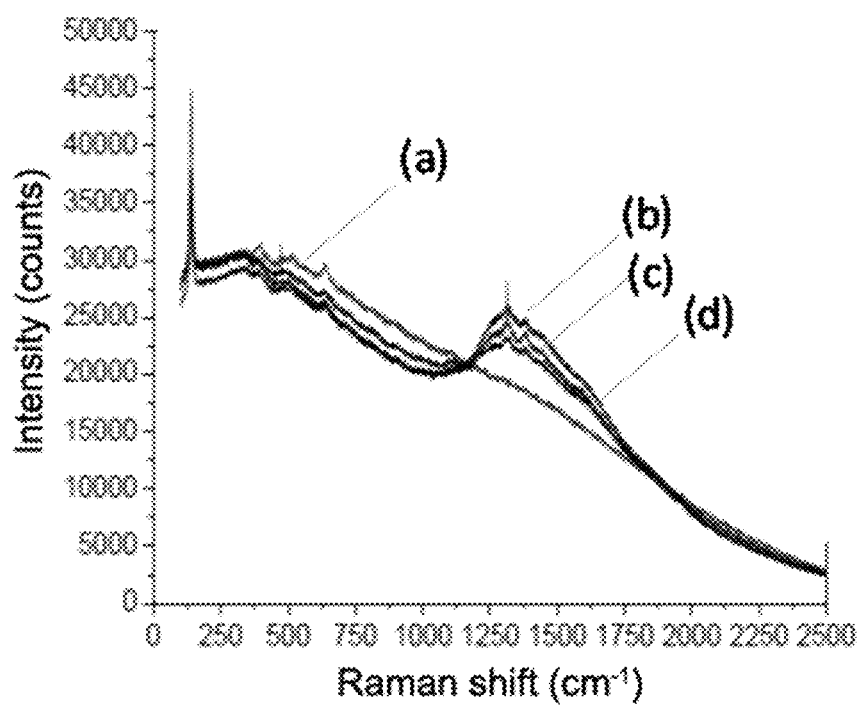

FIG. 15: Raman spectrum of security labels (a) and security labels comprising the security marker (b-d).

Figure 16:
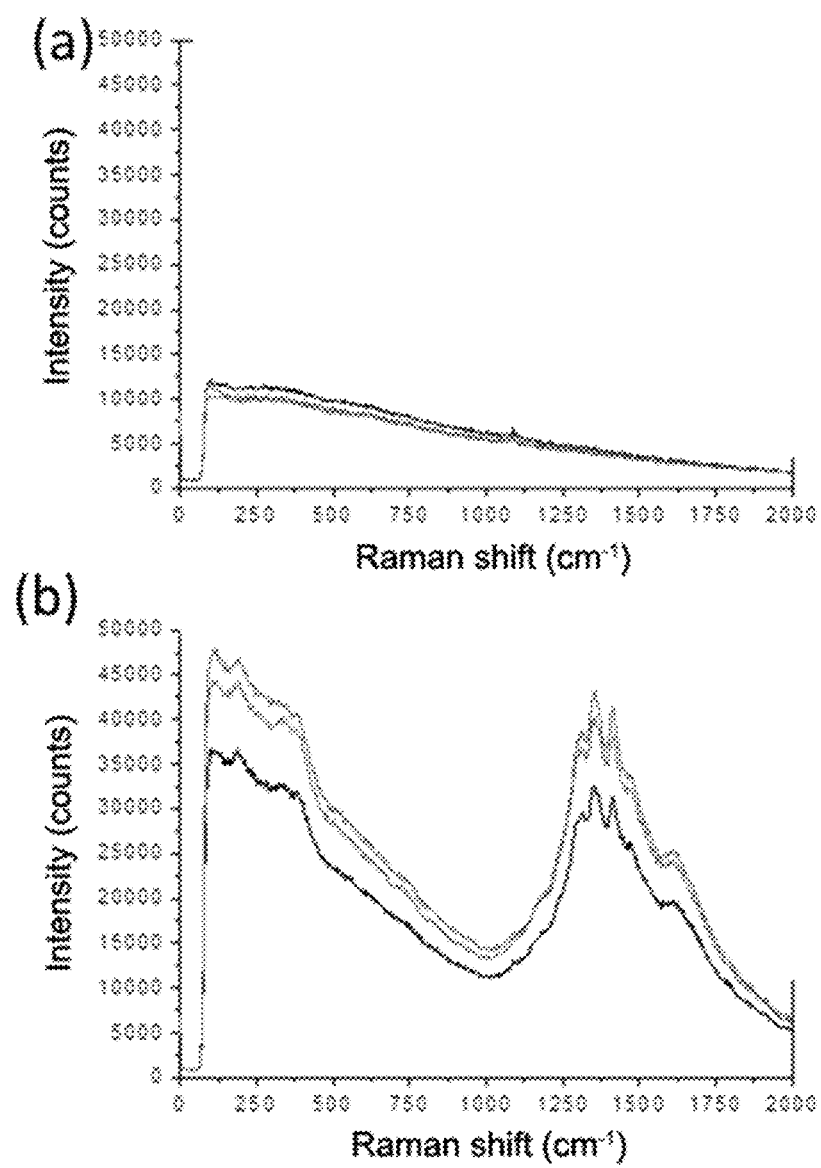

FIG. 16: Raman spectrum of coated paper (a) and coated paper comprising the security marker of the present invention (b).

DETAILED DESCRIPTION OF THE INVENTION

Unless stated otherwise, all the scientific terms used herein have the meaning commonly understood by the person skilled in the art for whom this description is intended. In the present invention, singular forms include plural forms unless otherwise indicated.

The authors of the present invention have observed that the Raman spectrum of a material comprising a glassy matrix comprising at least silicon and oxygen wherein crystalline particles of feldspars or feldspathoids with an average size less than 500 nm are embedded; and wherein an interface exists between the crystalline particles and the glassy matrix, wherein said material is obtainable by means of a given method comprising a thermal treatment at a temperature comprised between 500° C. and 1500° C. for a period of time between 0.1 min and 50 h, has a signal in the Raman shift range of 1000-2250 $cm^{-1}$ with certain characteristics when it is irradiated with monochromatic laser, and said signal can be detected and identified unequivocally. Furthermore, it has been observed that it is possible to break down or deconvolute said Raman signal to obtain a single Raman pattern characteristic of each marker comprising a set of two or more Raman bands with a position, half-width, and relative intensities which can be digitized and converted into a digitized unique code. Additionally, these Raman markers have a significant Raman signal in the Raman shift range between 1000 and 2250 $cm^{-1}$ which allows their detection in a security article, document, or element. An addition advantage is that the Raman markers of the present invention can be in the form of solid white particles suitable for their incorporation in security documents. Accordingly, the security marker of the present invention exhibits a particular Raman spectrum which can only be obtained for a specific combination of materials and a specific microstructure (combination of crystalline phases, amorphous phases, and interfaces) obtainable after a specific thermal treatment.

The inventors have observed that the modification of the microstructure of said security marker allows varying the characteristics of its Raman spectrum, and particularly the characteristics of the Raman signal in the Raman shift range of 1000-2250 $cm^{-1}$, meaning that counterfeiting this security marker would be extremely difficult. Furthermore, it has been observed that the presence of an optional second crystalline phase in the Raman marker also allows modifying its Raman spectrum. For example, upon addition of a second crystalline phase of a material having its own Raman spectrum, it is possible to obtain a security marker with additional bands in the Raman spectrum in addition to the main Raman signal in the Raman shift range of 1000-2250 cm$^{-1}$. Therefore, the use of this combination represents a further improvement in document security, given that the reproduction of said material is more complex.

Security Marker

Therefore, a first aspect of the present invention relates to a security marker obtainable by means of a method comprising the steps of:
  i. providing a mixture comprising:
     a. a source of silicon and oxygen;
     b. a source of aluminum; and
     c. a source of at least one element from the group consisting of Na, K, and Ca;
     wherein said sources (a, b, and c) come from the same material or from different materials;
  ii. optionally performing a mechanical treatment on the mixture of step (i) to yield a mixture; and
  iii. performing a thermal treatment at a temperature comprised between 500° C. and 1500° C. for a period of time between 0.1 min and 50 h on the mixture of (i) or (ii);
wherein said security marker comprises:
  a glassy matrix comprising at least the elements silicon and oxygen; and
  a first crystalline phase formed by crystalline particles embedded in said matrix; wherein said particles are feldspar or feldspathoid; wherein the average size of said particles is less than 500 nm; and
  wherein an interface exists between the crystalline particles and the glassy matrix.

The term "mixture" in the present invention refers to a physical combination or composition of at least two different materials. When said mixture consists of more than one material, it is preferably in solid state.

In the context of the present invention, the term "source of" in reference to a chemical element refers to a chemical material or compound comprising said chemical element in its composition. One and the same material or compound can act as a source of several chemical elements, for example, a feldspar mineral can act as a source of silicon and oxygen, aluminum, and at least one element from the group consisting of Na, K, and Ca, i.e., it could act as source a, b, and c of step (i) of the method of the present invention as they have been defined.

The term "glassy" refers to inorganic materials or compounds which do not exhibit long-range crystalline order in their atomic structure as is known in the state of the art; non-limiting examples of glassy materials are glass.

In this invention, "significant Raman signal" in the Raman shift range between 1000 and 2250 cm$^{-1}$ is defined as that signal having an intensity in that range of at least 0.5 times the signal corresponding to the signal of intensity for that same sample in the Raman shift range between 100 and 1000 cm$^{-1}$, once the background noise has been eliminated from said spectrum as is known in the state of the art.

In a preferred embodiment, source (a) of silicon and oxygen, source (b) of aluminum, and source (c) of at least one element from the group consisting of Na, K, and Ca come from different materials, wherein at least one of said materials is a mineral.

In a preferred embodiment, source (a) of silicon and oxygen, source (b) of aluminum, and source (c) of at least one element from the group consisting of Na, K, and Ca come from different materials, wherein at least one of said materials is a glassy material.

In a more particular embodiment, source (a) of silicon and oxygen and source (b) of aluminum is one and the same material; preferably a calcium aluminosilicate, more preferably kaolin; even more preferably kaolin with a composition expressed in equivalent oxides comprising $SiO_2$, $Al_2O_3$, and $K_2O$; even more preferably kaolin with a chemical composition expressed in % by weight of equivalent oxides comprising between 45 and 60% of $SiO_2$, between 35 and 45% of $Al_2O_3$, and between 0.1 and 1.5% of $K_2O$; even more preferably kaolin with a chemical composition expressed in % by weight of equivalent oxides comprising 55.5% of $SiO_2$, 42.5% of $Al_2O_3$, and 1.2% $K_2O$.

In a preferred embodiment, source (a) of silicon and oxygen and source (b) of aluminum is a calcium aluminosilicate, more preferably kaolin; even more preferably kaolin with a composition expressed in equivalent oxides comprising $SiO_2$, $Al_2O_3$, and $K_2O$; even more preferably kaolin with a chemical composition expressed in % by weight of equivalent oxides comprising between 45 and 60% of $SiO_2$, between 35 and 45% of $Al_2O_3$, and between 0.1 and 1.5% of $K_2O$; even more preferably kaolin with a chemical composition expressed in % by weight of equivalent oxides comprising 55.5% of $SiO_2$, 42.5% of $Al_2O_3$, and 1.2% $K_2O$; and wherein source (c) is a calcium carbonate. In a more preferred embodiment, source (a) of silicon and oxygen and source (b) of aluminum is kaolin, and source (c) is calcium carbonate; wherein in kaolin is at a weight percent between 50 and 90%; preferably between 60 and 80%.

In a preferred embodiment, source (a) of silicon and oxygen, source (b) of aluminum, and source (c) of at least one element from the group consisting of Na, K, and Ca is a mixture of:
  kaolin with a composition expressed in equivalent oxides comprising $SiO_2$, $Al_2O_3$, and $K_2O$; preferably with a chemical composition expressed in % by weight of equivalent oxides comprising between 45 and 60% of $SiO_2$, between 35 and 45% of $Al_2O_3$, and between 0.1 and 1.5% of $K_2O$; even more preferably kaolin with a chemical composition expressed in % by weight of equivalent oxides comprising 55.5% of $SiO_2$, 42.5% of $Al_2O_3$, and 1.2% $K_2O$; and
  a frit with a composition expressed in equivalent oxides comprising $SiO_2$, SrO, $Na_2O$, $K_2O$, and $Al_2O_3$; preferably with a chemical composition expressed in % by weight of equivalent oxides between 35 and 55% of $SiO_2$; between 5 and 15% of SrO; between 1.5 and 3.5 of $Na_2O$, between 1 and 2% of $K_2O$, and between 10 and 30% of $Al_2O_3$; even more preferably with a chemical composition expressed in % by weight of equivalent oxides of 51.6% of $SiO_2$, 8% of SrO, 2.7% of $Na_2O$, 1.4% $K_2O$, and 21.1% of $Al_2O_3$.

In a more preferred embodiment, kaolin can be found in the mixture at a weight percent between 1 and 20%; preferably between 5 and 15%.

In a particular embodiment, source (a) of silicon and oxygen is a glassy material, preferably a glass; more preferably a sodium-calcium-aluminous glass; even more preferably a glass with a composition expressed in oxide equivalents comprising $SiO_2$, $Na_2O$, CaO, and $Al_2O_3$; even more preferably a glass with a composition expressed in % by weight of oxide equivalents comprising between 50 and 80% of $SiO_2$, between 5 and 10% of $Na_2O$, between 5 and 10% of CaO, and between 1 and 10% of $Al_2O_3$; even more preferably a glass with a composition expressed in % by weight of oxide equivalents of: 69.7 $SiO_2$; 12.4 $Na_2O$; 7.22

CaO; 5.45 $Al_2O_3$; 4.06 MgO; 0.5 $K_2O$; 0.31 $K_2O$; 0.13 $B_2O_3$; 0.12 $Fe_2O_3$ and other minor oxides with a presence <0.1.

In a more particular embodiment, source (b) of aluminum is an aluminum oxide; preferably alumina ($Al_2O_3$); more preferably α-$Al_2O_3$, $Al(OH)_3$, γ-alumina. In a particular embodiment, source (b) of aluminum is a nanoparticulate material.

In a particular embodiment, source (c) of at least one element from the group consisting of Na, K, and Ca is an inorganic material comprising at least one element of Na, K, or Ca; more preferably a carbonate, an oxide, or a salt of at least one element from the group consisting of Na, K, and Ca.

In a more particular embodiment, source (c) of at least one element from the group consisting of Na, K, and Ca is an oxide of at least one element from the group consisting of Na, K, and Ca.

In a more particular embodiment, source (c) of at least one element from the group consisting of Na, K, and Ca is a carbonate of at least one element from the group consisting of Na, K, and Ca.

In a more particular embodiment, source (c) of at least one element from the group consisting of Na, K, and Ca is a salt of at least one element from the group consisting of Na, K, and Ca.

In a more particular embodiment, source (a) of silicon and oxygen and source (c) of at least one element from the group consisting of Na, K, and Ca, is a glass; more preferably a sodium-calcium-aluminous glass; even more preferably a glass with a composition expressed in oxide equivalents comprising $SiO_2$, $Na_2O$, CaO, and $Al_2O_3$; even more preferably a glass with a composition expressed in % by weight of oxide equivalents comprising between 50 and 80% of $SiO_2$, between 5 and 10% of $Na_2O$, between 5 and 10% of CaO, and between 1 and 10% of $Al_2O_3$; even more preferably a glass with a composition expressed in % by weight of oxide equivalents of: 69.7 $SiO_2$; 12.4 $Na_2O$; 7.22 CaO; 5.45 $Al_2O_3$; 4.06 MgO; 0.5 $K_2O$; 0.31 $K_2O$; 0.13 $B_2O_3$; 0.12 $Fe_2O_3$ and other minor oxides with a presence <0.1%.

In a more particular embodiment, source (a) of silicon and oxygen, source (b) of aluminum, and source (c) of at least one element from the group consisting of Na, K, and Ca is a glass; more preferably a sodium-calcium-aluminous glass; even more preferably a glass with a composition expressed in oxide equivalents comprising $SiO_2$, $Na_2O$, CaO, and $Al_2O_3$; even more preferably a glass with a composition expressed in % by weight of oxide equivalents comprising between 50 and 80% of $SiO_2$, between 5 and 10% of $Na_2O$, between 5 and 10% of CaO, and between 1 and 10% of $Al_2O_3$; even more preferably a glass with a composition expressed in % by weight of oxide equivalents of: 69.7 $SiO_2$; 12.4 $Na_2O$; 7.22 CaO; 5.45 $Al_2O_3$; 4.06 MgO; 0.5 $K_2O$; 0.31 $K_2O$; 0.13 $B_2O_3$; 0.12 $Fe_2O_3$ and other minor oxides with a presence <0.1%.

In another particular embodiment, source (a) of silicon and oxygen is a silicon oxide, source (b) of aluminum is an aluminum oxide, and source (c) of at least one element from the group consisting of Na, K, and Ca is a sodium carbonate, preferably the sodium carbonate and aluminum oxide are at a percent by mass between 10 and 20% and the sodium carbonate is at a percent by mass between 50 and 70%.

In a more particular embodiment, source (a) of silicon and oxygen, source (b) of aluminum, and source (c) of at least one element from the group consisting of Na, K, and Ca is a tectosilicate; more preferably a feldspar, even more preferably a crystalline feldspar. Non-limiting examples of feldspars suitable for the present invention are sodium and potassium feldspars.

In a more particular embodiment, source (a) of silicon and oxygen, source (b) of aluminum, and source (c) of at least one element from the group consisting of Na, K, and Ca is a material selected from the group consisting of orthoclase, sanidine, microcline, anorthoclase, albite, oligoclase, andesine, labradorite, banalsite, bytownite, anorthite, leucite, nepheline, analcime, cancrinite $(Na,Ca)_{7-8}(Al_6Si_6O_{24})(CO_3SO_4)_{1,5-2}\cdot 5\ H_2O$, hauyne $(Na,Ca)_{4-8}\ Al_6Si_6(O,S)_{24}(SO_4,Cl)_{1-2}$, lazurita $(Na,Ca)_{7-8}\ (Al,\ Si)_{12}\ (O,S)_{24}[(SO_4), Cl_2,\ (OH)_2]$, nosean $Na_8Al_6Si_6O_{24}SO_4\cdot H_2O$, petalite, $LiAlSi_4O_{10}$, sodalite $Na_8Al_6Si_6O_{24}Cl_2$, and combinations thereof.

Non-limiting examples of feldspar-type tectosilicates suitable for the present invention are alkali feldspars; preferably alkali feldspars including potassium in their composition; more preferably orthoclase, sanidine, microcline, and anorthoclase.

Non-limiting examples of feldspar-type tectosilicates suitable for the present invention are plagioclases including sodium and calcium in their composition; preferably albite, oligoclase, andesine, labradorite, banalsite, bytownite, and anorthite.

Non-limiting examples of feldspathoid-type tectosilicates suitable for the present invention are simple feldspathoids including potassium in their composition; preferably leucite, nepheline and analcime.

Non-limiting examples of feldspathoid-type tectosilicates suitable for the present invention are complex feldspathoids such as, for example, cancrinite $(Na,\ Ca)_{7-8}\ (Al_6Si_6O_{24})(CO_3SO_4)_{1,5-2}\cdot 5H_2O$; hauyne $(Na,\ Ca)_{4-8}Al_6Si_6\ (O,S)_{24}(SO_4,\ Cl)_{1-2}$; lazurite $(Na,\ Ca)_{7-8}\ (Al,\ Si)_{12}\ (O,S)_{24}[(SO_4), Cl_2,\ (OH)_2]$; nosean $Na_8Al_6Si_6O_{24}SO_4\cdot H_2O$; petalite, $LiAlSi_4O_{10}$, and sodalite $Na_8Al_6Si_6O_{24}Cl_2$.

In a more particular embodiment, source (a) of silicon and oxygen, source (b) of aluminum, and source (c) of at least one element from the group consisting of Na, K, and Ca is a sodium feldspar, preferably a sodium feldspar with a composition expressed in oxide equivalents comprising $SiO_2$, $Al_2O_3$, and $Na_2O$; more preferably a sodium feldspar with a composition expressed in % by weight of oxide equivalents comprising between 50 and 70% of $SiO_2$, between 15 and 25% of $Al_2O_3$, and between 15 and 25% of $Na_2O$.

In a more particular embodiment, source (a) of silicon and oxygen, source (b) of aluminum, and source (c) of at least one element from the group consisting of Na, K, and Ca is a potassium feldspar, preferably a sodium feldspar with a composition expressed in oxide equivalents comprising $SiO_2$, $Al_2O_3$, and $K_2O$; more preferably a sodium feldspar with a composition expressed in % by weight of oxide equivalents comprising between 50 and 70% of $SiO_2$, between 15 and 25% of $Al_2O_3$, and between 15 and 25% of $K_2O$.

In a more particular embodiment, source (a) of silicon and oxygen and source (c) of at least one element from the group consisting of Na, K, and Ca is a glass; more preferably a sodium-calcium-aluminous glass; even more preferably a glass with a composition expressed in oxide equivalents comprising $SiO_2$, $Na_2O$, CaO, and $Al_2O_3$; even more preferably a glass with a composition expressed in % by weight of oxide equivalents comprising between 50 and 80% of $SiO_2$, between 5 and 10% of $Na_2O$, between 5 and 10% of CaO, and between 1 and 10% of $Al_2O_3$; even more preferably a glass with a composition expressed in % by weight of oxide equivalents of: 69.7 $SiO_2$; 12.4 $Na_2O$; 7.22 CaO; 5.45 $Al_2O_3$; 4.06 MgO; 0.5 $K_2O$; 0.31 $K_2O$; 0.13 $B_2O_3$; 0.12 $Fe_2O_3$ and other minor oxides with a presence <0.1%; and source (b) of aluminum is an aluminum oxide, preferably $Al_2O_3$. In an even more particular embodiment, the glass/alumina proportion by weight is between 90/10 and 10/90; preferably between 25/75 and 75/25.

In a preferred embodiment, step (i) of the method of the present invention is providing a mixture comprising:

- a glass; more preferably a sodium-calcium-aluminous glass; even more preferably a glass with a composition expressed in oxide equivalents comprising $SiO_2$, $Na_2O$, CaO, and $Al_2O_3$; even more preferably a glass with a composition expressed in % by weight of oxide equivalents comprising between 50 and 80% of $SiO_2$, between 5 and 10% of $Na_2O$, between 5 and 10% of CaO, and between and 10% of $Al_2O_3$; even more preferably a glass with a composition expressed in % by weight of oxide equivalents of: 69.7 $SiO_2$; 12.4 $Na_2O$; 7.22 CaO; 5.45 $Al_2O_3$; 4.06 MgO; 0.5 $K_2O$; 0.31 $K_2O$; 0.13 $B_2O_3$; 0.12 $Fe_2O_3$ and other minor oxides with a presence <0.1%; and
- a lanthanide oxide; preferably a europium oxide, a cerium oxide, or a combination of both; more preferably $CeO_2$; and optionally, an aluminum oxide.

In a more particular embodiment, lanthanide oxides are at a weight percent between 1 and 30%; preferably between 4 and 20%.

In a particular embodiment, the mixture of step (i) further comprises a lanthanide or rare earth source; preferably a lanthanide or rare earth oxide, more preferably cerium oxide, europium oxide or a mixture of both.

In a particular embodiment, the mixture of step (i) further comprises cerium; preferably cerium oxide ($CeO_2$).

In a particular embodiment, the mixture of step (i) further comprises europium, preferably europium oxide ($Eu_2O_3$).

In the context of the present invention, the expression "mechanical treatment" or "conditioning" refers to a grinding and/or milling process or a combination of grinding or milling processes, said processes preferably being used to reduce the particle size of a solid to a given range of sizes. Grinding and/or milling processes suitable for the mechanical treatment of the present invention can be selected from any of those known to one skilled in the art. Non-limiting examples of said processes are those performed by means of mills such as, for example, by means of planetary mills or jaw crushers. Non-limiting examples of mills suitable for the mechanical treatment of the present invention are ring crushers such as tungsten carbide ring crushers, jet mills, or ball or micro ball mills, among others.

In a more particular embodiment, the mechanical treatment of step (ii) consists of milling; preferably milling in a ball mill.

In the context of the present invention, the expression "thermal treatment" refers to a heating process and optionally to a cooling process. In particular, it refers to a heating process at a temperature comprised between 500° C. and 1500° C. Said thermal treatment can be performed by means of conventional heating methods such as, for example, by means of furnaces, muffles, etc., under pressure, or by means of other methods such as Spark Plasma Sintering (SPS).

In a particular embodiment, the thermal treatment of step (iii) is performed at a temperature comprised between 500° C. and 1500° C.; preferably between 600° C. and 1300° C.; more preferably between 700° C. and 1250° C. In a more particular embodiment, the thermal treatment of step (iii) comprises a step of heating at a continuous rate until reaching the desired temperature, preferably at a heating rate between 0.1 and 50° C./min; more preferably between 1 and 40° C./min; even more preferably between 5 and 30° C./min. In another more particular embodiment, the thermal treatment of step (iii) comprises a step of cooling at a continuous rate until reaching room temperature, preferably at a cooling rate between 0.1 and 50° C./min; more preferably between 1 and 40° C./min; even more preferably between 5 and 30° C./min.

In a particular embodiment, the thermal treatment of step (iii) is performed under pressure; preferably at pressure values between 5 and 100 MPa; more preferably between 10 and 50 MPa;

In a particular embodiment, the thermal treatment of step (iii) is performed for a period of time between 0.01 and 50 h, preferably between 0.02 and 30 h; more preferably between 0.03 and 20 h; even more preferably between 0.05 and 10 h.

In a more particular embodiment, the thermal treatment of step (iii) is performed by means of the spark plasma sintering (SPS) technique under pressure; preferably under pressure between 10 and 200 MPa; preferably at about 50 MPa.

In a more particular embodiment, the method of preparing the security marker of the present invention comprises a step (iv) of mechanical treatment of the material obtained in step (ii), preferably milling. This step would be similar to the step described for step (ii) in each of its particular embodiments and can be performed before or after step (ii).

Glassy Matrix

In the context of the present invention, the expression "glassy matrix" refers to a matrix comprising at least the elements silicon and oxygen and the state of which is glassy, or in other words amorphous. In the glassy matrix of the present invention, the silicon can be coordinated to four oxygen atoms, wherein said oxygen atoms are located at the vertices of a tetrahedron; wherein said tetrahedrons are isolated and/or form rings which can be formed by one or more tetrahedrons, preferably forming at its large part rings consisting of 3 and 4 tetrahedrons. The glassy matrix of the present invention can come from one or more of sources a, b, or c which form the mixture of step (i) or can be formed during the thermal treatment of step (iii) of the method of obtaining the security marker of the present invention.

In a particular embodiment, the glassy matrix of the marker of the present invention further comprises at least one element or a combination of elements from the group consisting of Na, K, Ca, Fe, Ti, Zn, Al, B, Ba, Mg, Sr, and Cs; preferably Al, Na, K, and Ca.

In a particular embodiment, the glassy matrix of the marker of the present invention is at a percent by mass between 2% and 99%; more preferably between 3% and 98% by mass; even more preferably between 10% and 90% by mass.

First Crystalline Phase

In the context of the present invention, the expression "crystalline phase" refers to a material comprising atoms arranged in a highly ordered manner, forming repeating patterns extending in the three dimensions of space, as understood in the state of the art, preferably with a feldspar or feldspathoid structure.

The security marker of the present invention comprises at least a first crystalline phase and optionally more crystalline phases in its composition. The security marker comprises a first crystalline phase formed by crystalline particles embedded in the glassy matrix of the present invention; wherein said particles have a feldspar or feldspathoid structure and wherein the average size of said particles is less than 500 nm; preferably wherein said particles are feldspars or feldspathoids.

In a particular embodiment, the crystalline particles of the present invention have an average size less than 500 nm; preferably less than 400 nm; preferably less than 350 nm; more preferably between 5 and 300 nm; more preferably between 7 and 280 nm; even more preferably between 10 and 250 nm.

In a particular embodiment, the crystalline particles of the first crystalline phase of the present invention have an average size less than 500 nm; preferably less than 400 nm; preferably less than 350 nm; more preferably between 5 and 300 nm; more preferably between 7 and 280 nm; even more preferably between 10 and 250 nm.

In a particular embodiment, the crystalline particles of the second crystalline phase of the present invention have an average size less than 500 nm; preferably less than 400 nm; preferably less than 350 nm; more preferably between 5 and 300 nm; more preferably between 7 and 280 nm; even more preferably between 10 and 250 nm.

In the context of the present invention, the expression "average size" of the crystalline particles refers to the value of the diameter calculated as the median of the distribution curve of the diameters measured for a representative sample of the crystalline particles using different methods known in the art. The average size can be calculated, for example, by calculating the value of the diameter as the median of the distribution curve of the diameters measured for a representative sample of the crystalline particles by the determination of the diameter of at least 100 particles, preferably at least 300 particles, by means of scanning or transmission electron microscopy techniques.

In the context of the present invention, the expression "feldspar" refers to materials based on aluminosilicates comprising a composition which is found in the ternary system the ends of which are formed by orthoclase ($KAlSi_3O_8$), anorthite ($CaAl_2Si_2O_8$), and albite ($NaAlSi_3O_8$) known in the state of the art, and comprising alkali feldspars ($Na_xK_{1-x}AlSi_3O_8$, wherein X is a number comprised between 0 and 1), plagioclases ($Na_xCa_{1-x}Al_{2-x}Si_{2+x}O_8$, wherein X is a number comprised between 0 and 1) and mixtures thereof.

In the context of the present invention, the expression "feldspathoid" in relation to the first crystalline phase refers to materials similar to feldspars but with a different structure and with a composition comprising about a third less silica content than said feldspars. Similarly to feldspars, feldspathoids are formed by silica tetrahedron rings but with a larger number of tetrahedrons in each ring. For example, the structure of nepheline ($NaAlSiO_4$) is formed by 6-membered rings of silica and aluminum tetrahedrons.

Non-limiting examples of feldspars or feldspathoids suitable for the present invention is a material selected from the group consisting of orthoclase, sanidine, microcline, anorthoclase, albite, oligoclase, andesine, labradorite, banalsite, bytownite, anorthite, leucite, nepheline, analcime, cancrinite, hauyne, lazurite, nosean, petalite, sodalite, and combinations thereof; preferably selected from orthoclase, sanidine, microcline, anorthoclase, albite, oligoclase, andesine, labradorite, banalsite, bytownite, anorthite, leucite, nepheline, analcime, cancrinite, and combinations thereof.

The crystalline particles of the present invention can be solid particles or can be formed by aggregates or agglomerates of particles or nanoparticles; they preferably consist of aggregates or agglomerates of particles or nanoparticles, more preferably aggregates or agglomerates of nanoparticles, wherein said nanoparticles have an average size between 1 and 50 nm.

In the context of the present invention, the term "embedded" in relation to the crystalline particles of the marker of the present invention refers to the fact that said particles can be, whether aggregated, agglomerated or dispersed, completely surrounded by the glassy matrix of the present invention.

In a particular embodiment, the crystalline particles of the present invention are feldspars; preferably they are particles with plagioclase structure, more preferably plagioclase with a proportion of albite >60%.

In a particular embodiment, the crystalline particles of the present invention are alkali feldspars; they are preferably particles with an anorthite structure.

In a particular embodiment, the crystalline particles of the present invention are feldspathoids; they are preferably particles with a nepheline structure.

In a particular embodiment, the crystalline particles of the present invention comprise silicon and aluminum in a proportion of 3:1 to 1:1; preferably 3:1 to 2:1; more preferably around 3:1; even more preferably 3:1.

In a more particular embodiment, the first crystalline phase of the present invention is in a proportion of at least 1% by weight; preferably at least 2%; more preferably at least 5%; even more preferably between 5 and 10% by weight.

Interface

The security marker of the present invention comprises an interface. Preferably, said interface exists between the crystalline particles forming the first crystalline phase and the glassy matrix. In the context of the present invention, the term "interface" is understood to mean the region of space comprised between two different phases and in which the physical and chemical properties vary from those corresponding to a phase to the characteristics of the physical and chemical properties of the other phase, for example from a crystalline phase to a glassy phase. For example, an interface exists between a crystalline phase and a glassy phase may comprise several units to tens of primitive crystalline cells similar to those of the crystalline phase. The authors of the present invention have observed that the interface of the present invention is formed during the thermal treatment performed on the initial mixture of the present invention at a temperature comprised between 500° C. and 1500° C. for a period of time between 0.1 min and 50 h. Surprisingly, the authors of the present invention have observed that the presence of an interface in the microstructure seems to be related to the Raman signals characteristic of the material.

Without being bound to any particular theory, the authors of the present invention have observed that the thermal treatment of step (ii) of the method of obtaining the security marker of the present invention results in the formation of a first crystalline phase formed by crystalline particles embedded in a glassy matrix wherein an interface exists between the crystalline particles and the glassy matrix, giving rise to a characteristic Raman spectrum, particularly when the crystalline particles of the present invention have an average size less than 500 nm.

Second Crystalline Phase

The security marker of the present invention optionally comprises a second crystalline phase, preferably a second crystalline phase with a Raman signal in the Raman shift range of 100 to 1000 $cm^{-1}$ of the spectrum. Preferably, said second crystalline phase is a metal oxide. Said second crystalline phase may comprise a single or double oxide, wherein said oxide is in the form of particles with an average size greater than 500 nm; preferably greater than one micron.

In a particular embodiment, the single or double oxide has a crystalline structure selected from crystalline triclinic, monoclinic, orthorhombic, tetragonal, hexagonal, or cubic systems, forming different crystalline phases such as, in a non-limiting manner: aurivillius, tungsten bronze, corundum, cristobalite, quartz, spinel, fluorite, garnet, ilmenite, perovskite, rutile, zircon, and wurzite.

In a more particular embodiment, the second crystalline phase of the present invention comprises silicon oxide ($SiO_2$), preferably quartz.

In a particular embodiment, the second crystalline phase of the present invention comprises zirconium silicate ($ZrSiO_4$).

In a more particular embodiment, the second crystalline phase of the present invention comprises silicon oxide ($SiO_2$), zirconium silicate ($ZrSiO_4$), or a lanthanide oxide, preferably silicon oxide ($SiO_2$), zirconium silicate ($ZrSiO_4$), cerium oxide, europium oxide, or a combination of said oxides.

In a particular embodiment, the second crystalline phase comprises a lanthanide or rare earth oxide, preferably cerium oxide, europium oxide, or a mixture of both.

In a particular embodiment, the lanthanide oxide of the present invention is preferably cerium oxide ($CeO_2$).

In a particular embodiment, the lanthanide oxide of the present invention is preferably cerium oxide ($Eu_2O_3$).

In a particular embodiment, the second crystalline phase of the present invention is in the form of crystalline particles with an average size greater than 500 nm; preferably greater than a micron; more preferably greater than two micras; even more preferably greater than five micras.

In a preferred embodiment, the second crystalline phase of the present invention comprises a material with a characteristic Raman spectrum.

Without being bound to any particular theory, the authors of the present invention have found that the presence of a second crystalline phase allows modifying the Raman spectrum of said security marker. In particular, upon addition of a second crystalline phase of a material having a Raman spectrum with characteristic bands, it is possible to obtain a security marker with additional bands in addition to the main Raman signal in the Raman shift range between 1000 and 2250 $cm^{-1}$. Therefore, the use of this combination represents a further improvement in document security, given that the reproduction of said material increases in complexity.

The security marker of the present invention optionally comprises a third or more crystalline phases in its composition.

The second or the following crystalline phases of the security marker of the present invention can be added in any step of the method of preparing the security marker of the present invention and even after the method of preparing same.

In a particular embodiment, the security marker of the present invention is colorless or white; preferably white.

Another aspect of the invention relates to a security marker comprising:
a glassy matrix comprising at least the elements silicon and oxygen; and
a first crystalline phase formed by crystalline particles embedded in said matrix; wherein said particles are feldspars or feldspathoids; wherein the average size of said crystalline particles is less than 500 nm; and
wherein an interface exists between the crystalline particles and the glassy matrix.

In a particular embodiment, the security marker of the present invention is in a powder state; preferably formed by particles with diameters less than 100 μm, more preferably formed by particles with diameters less than 50 μm, even more preferably formed by particles with diameters less than 20 μm.

In a particular embodiment, the security marker of the present invention comprises a third crystalline phase which is an inorganic pigment.

Method of Preparing the Security Marker

In an additional aspect, the present invention relates to method of preparing the security marker of the present invention comprising the steps of:
i. providing a mixture comprising:
 a. a source of silicon and oxygen;
 b. a source of aluminum;
 c. a source of at least one element from the group consisting of Na, K, and Ca;
 wherein said sources (a, b, and c) may come from the same material or from different materials;
ii. optionally performing a mechanical treatment on the mixture of step (i) to yield a mixture; and
iii. performing a thermal treatment at a temperature comprised between 500° C. and 1500° C. for a period of time between 0.1 min and 50 h on the mixture of (i) or (ii).

In a more particular embodiment, the method of preparing the security marker of the present invention comprises a step (iv) of mechanical treatment of the material obtained in step (ii); preferably milling. This step would be similar to the step described for step (i) in each of its particular embodiments. Step (iv) can take place before or after step (iii) of the present invention.

The method of preparing the security marker of the present invention comprises all the particular embodiments defined above for each of the steps and terms thereof.

Use of the Security Marker

One aspect of the present invention relates to the use of the security marker defined above in any of its particular embodiments to authenticate security elements, security documents, security articles, or objects of value; preferably security documents or articles; more preferably security documents.

A particular embodiment relates to the use of the security marker defined above in any of its particular embodiments to authenticate security elements.

A particular embodiment relates to the use of the security marker defined above in any of its particular embodiments to authenticate security documents.

A particular embodiment relates to the use of the security marker defined above in any of its particular embodiments to authenticate security articles.

A particular embodiment relates to the use of the security marker defined above in any of its particular embodiments to authenticate objects of value.

In the present invention, the term authenticate may be interpreted as tracing the origin of the materials forming said security elements, security documents, security articles, or objects of value, their manufacturing processes, and/or their means or channels of distribution.

Object of Value, Security Article, Document, or Element

In an additional aspect, the present invention relates to a security article, document, or element comprising the security marker as defined above in any of its particular embodiments. An additional aspect relates to an object of value comprising the security marker of the present invention. In a particular embodiment the security marker can be immobilized in the security article, document or element of the present invention.

Therefore, in the context of the present invention the term "security element" refers to an element comprising a security marker as defined above in any of the particular embodiments. Non-limiting examples of security elements are security paper, security threads, security fibers, security inks, watermarks, tactile effects, cellulose strips, layers of glues, lacquers, patches, planchettes, holograms, pigments, plastic sheets, polymer substrates, or a combination thereof; preferably security paper, security threads, security fibers, and security inks. The security marker of the present invention can be incorporated in a security document or article directly or by means of the incorporation of a security element comprising said security marker. Furthermore, the security marker of the present invention can be incorporated in an object of value directly or by means of the incorporation of a security element comprising said security marker. That is, the security element of the present invention can be incorporated in a security article, security document, or an object of value.

In the context of the present invention, the term "article" is understood to mean a good or thing used in trade. In the context of the present invention, the term "security article" refers to an article comprising the security marker of the present invention as defined in any of the preceding particular embodiments. Non-limiting examples of security article are devices for the identification and access of individuals or products, bank cards, payment devices, tickets for the lottery and games of chance, security seals, currency, and commemorative medals; preferably bank cards, passports, tickets for the lottery, currency, and commemorative medals.

A "security article" may comprise the "security document" and/or the "security element" of the present invention. A non-limiting example of "security article" is a passport comprising security documents (page containing identification data, inside pages for visas, etc.) and in turn comprising security elements (for example, fluorescent thread in the passport book seam). In turn, the mentioned "security documents" (pages containing data) may comprise security elements (fluorescent fibers in the paper pulp, a security thread on the inside pages, printing inks, adhered holographic films, etc.).

In the context of the present invention, the term "security document" refers to a document comprising a polymer substrate or a paper substrate, and the security marker of the present invention as defined in any of the preceding particular embodiments. Non-limiting examples of security document are security paper, identification documents, banknotes, checks, stamps, stamp-impressed paper, labels, and tickets; preferably security paper and banknotes. The "security document" of the present invention may comprise the "security element" of the present invention.

In the context of the present invention, the term "object of value" refers to an article, object, or good with a high economic value on the market which comprises the security marker of the present invention as defined in any of the preceding particular embodiments. Non-limiting examples of objects of value are jewels, works of art, medicinal products, clothing, leather articles, vehicle spare parts, and articles subject to special taxes, such as tobacco and alcohol; preferably jewels, works of art, clothing, leather articles, historical objects, antiquities, rare books, electronic components, limited edition objects (i.e. a small run of items, such as a print of a master image, that is intended to create a sense of rarity or exclusivity among potential collectors such as limited edition artwork), collector items (i.e. an object valued by collectors, because it is rare, beautiful, or has some special interest) and vehicle spare parts. An "object of value" may comprise the "security element" of the present invention.

In the context of the present invention, the expression "security article and/or document" will be understood to mean "security article" and/or "security document". Likewise, the expression "security element(s), article(s), and/or document(s)" will be understood to mean "security element(s), security article(s), and/or security document(s)". Wherein the present invention refers to the security elements, articles, or documents or objects of value of the present invention in any of its particular embodiments, it is referring to all of them together or individually.

Security Element

In a particular embodiment, the invention relates to a security element comprising the security marker as defined above in any of the particular embodiments; particularly wherein the security marker is immobilized in the security element. Non-limiting examples of security elements are security paper, security threads, security fibers, security inks, watermarks, tactile effects, cellulose strips, layers of glues, lacquers, patches, planchettes, holograms, pigments or substances of security, plastic sheets, and polymer substrates. The security element comprises the security marker of the present invention and said security marker may be part of the composition of the security element.

Furthermore, the security element of the present invention can be incorporated in different products for authenticating them, such as in objects of value and/or in security articles or documents, for example.

That is, an object of value or a security article or document may comprise the security element of the present invention. For example, an object of value or a security article or document may comprise the security element such that said element is found within the mass of the object of value or security article or document or on the surface thereof.

Nevertheless, given that Raman spectroscopy is fundamentally sensitive to the surface region, the security element of the present invention is preferably incorporated on the surface of said security document or article.

In a particular embodiment, the security element of the present invention is selected from holograms, security inks, or plastic sheets.

The security marker of the present invention or the security element of the present invention can be randomly distributed or fixed in specific positions of the object of value or security document or article in which it is incorporated. Said positions can be distributed along the surface of the object of value or security document or article, or at different depths of the layers forming said object of value or security document or article.

In a particular embodiment, the security marker of the present invention or the security element of the present invention is located in specific positions of the object of value or security article or document in which it is incorporated; preferably in different positions along the surface and/or depth thereof. An object of value or security article or document may comprise the security marker of the present invention or the security element of the present invention such that said security marker or security element is located in different positions of the object of value, article, or document and even with a different metering. It would therefore be possible to further hinder its detection.

Therefore, the security marker or security element of the present invention provides security features to the object of value or security document or article containing it, wherein said features may be of various nature, provided that the objective thereof is to hinder falsification of the security documents or articles or facilitate their authentication. The security marker or security element of the present invention also provides traceability features to the object of value or security document or article containing it. That is, the verification of the presence of the security marker or security element of the present invention in said object of value or security document or article allows for tracing the origin of the materials which form it and/or the manufacturing process thereof.

These security elements can be prepared from the security marker of the present invention, following the usual methods known to one skilled in the art.

In a particular embodiment of the invention, the security marker of the present invention is deposited as part of a coating of the security article or document; preferably as part of a coating of the security document.

In a particular embodiment of the invention, the security marker of the present invention is deposited in supports with the form of fibers; preferably in cellulose or synthetic fiber supports; more preferably in natural cellulose fibers, more preferably in cotton fibers. Security fibers which can be incorporated as part of the fibers themselves forming the security paper are thereby provided. In a particular embodiment, the security document of the present invention is security paper comprising security fibers comprising the security marker of the present invention.

In a preferred embodiment, the security element comprising the security marker as defined above in any of the particular embodiments is security fibers; preferably polymer security fibers.

In another particular embodiment, the security marker is deposited on support particles, which are in turn incorporated into the formulation of an ink thus giving rise to security inks.

In another particular embodiment, the security element is a security ink comprising the security marker as previously defined.

If the security marker has an average particle size less than 5 µm, said marker can be deposited on transparent microparticles, or even on the actual particles that are part of the inks used as security elements, images can be printed with them in any part of a document, without the possibility of them being detected with the naked eye or using conventional methods, with the exception of the methods defined in this invention. Furthermore, given that the inks used for defining colors in binary images and barcodes have the same chemical composition, it is impossible to distinguish the presence of these images using any other characterization technique. A particular image can thus be drawn over the numeral of a banknote, for example, and this image is detectable using only suitable Raman equipment.

If the security marker has a color, for example white, said marker can be used in the same way taking into account the modification of the final ink.

In the particular case of using inks, the security element is formed not only by a material with well-defined properties in that it exhibits a specific Raman spectrum, but it can also give rise to a particular code, i.e., a two dimensional image, an anagram, or a binary code such as a barcode. This method simplifies the detection of the security element since the latter is located in a well defined region of the security document.

Furthermore, the security element as defined above can be used for marking security articles or documents, preferably in the security sector.

Security Article or Document

The invention relates to a security article or document comprising the security marker of the present invention as defined in any of the preceding particular embodiments or the security element of the present invention; preferably the security marker.

According to the present invention, the terms security article or document refer to the articles or documents having particular characteristics which assure their origin, and therefore, their authenticity. These security articles or documents include all of those used by public administrations and their public organizations, as well as those used in the private sector when they circulate greatly between the group of citizens and companies, and containing identification, authentication or anti-forgery means or devices.

Preferably, the security documents or articles are selected from identification documents, such as ID cards, passports, permits and the like, and documents of value, such as banknotes, checks, stamps, certificates and the like. Preferably, the security article or document is selected from security paper, identification documents, banknotes, checks, stamps, stamp-impressed paper, labels, and tickets; more preferably, security paper.

In a particular embodiment, the security article, document, or element of the present invention is selected from printing labels, self-adhesive security labels, security paper, and security inks.

In a more particular embodiment, the security article, document, or element of the present invention is security labels comprising the security marker; wherein the security marker is located on the surface of said security labels; preferably printed.

In a more particular embodiment, the security article, document, or element of the present invention is security paper comprising the security marker; wherein said security marker is located within the mass or on the surface of the security paper; preferably within the mass; more preferably within the mass forming part of security fibers or of cellulose strips; even more preferably of security fibers.

In a more particular embodiment, the security article, document, or element of the present invention is security paper comprising the security marker; wherein said security marker is located within the mass or on the surface of the security paper; preferably on the surface; more preferably on the surface forming part of a polymer layer; preferably said layer is a coating or gumming.

In a more particular embodiment, the security article, document, or element of the present invention is an ink comprising the security marker.

Object of Value

The invention relates to an object of value comprising the security marker of the present invention as defined in any of the preceding particular embodiments or the security element of the present invention.

Method of Preparing the Security Article, Document, or Element or Object of Value One aspect of the present invention relates to a method of preparing the security article, document, or element of the present invention (as defined above in any of its particular claims) or the object of value of the present invention, comprising the security marker as defined, said method comprises the incorporation of the security marker; wherein said incorporation is performed:

i. while manufacturing the material used for making the security article, document, or element or the object of value;
ii. as part of an additive added to the security article, document, or element or the object of value; or
iii. on the surface of said security article, document, or element or said object of value.

A particular embodiment relates to the method of preparing the security article or document or the object of value as defined above, comprising the security marker as defined, said method comprises the incorporation of the security marker; wherein said incorporation is performed:
i. while manufacturing the material used for making the security article or document or the object of value;
ii. as part of an additive added to the security article or document or the object of value; or
iii. on the surface of said security article or document or object of value.

In a particular embodiment, the security marker of the present invention may be part of a unique security composition which is incorporated in the security article, element, or document or object of value according to any of methods i)-iii) described above.

The security marker of the present invention can be added to the paper pulp of the security documents as dry filler. Nevertheless, given that the measurement technique is fundamentally sensitive to the surface region, it is preferably incorporated on the surface of the document as an additive added to security elements which are adhered or printed on the surface thereof or are part of the surface coatings. It can also be incorporated in polymer films, such as polyvinyl alcohol films, for example, which may cover the security article or document. It can also be incorporated in the inks used for printing the security document, wherein it can be part of tactile marking elements, images, figures, legends, or barcodes. The security document or article is thereby provided with the Raman spectrum (or code) corresponding to the security marker of the present invention.

In a particular embodiment of the invention, the security marker of the present invention is deposited within the mass or on the surface of substrates in the form of fibers. It is thus possible to deposit said marker on cellulose or synthetic fibers, preferably natural cellulose fibers, more preferably cotton fibers, such that security fibers which can be incorporated in the security paper or security document directly, as part of the fibers themselves making up the paper are provided.

In another particular embodiment, the security marker of the present invention is deposited on microparticles, wherein the latter are in turn incorporated in the paper pulp in the form of pigment or in the actual formulation of the ink, thus forming security inks as mentioned above for security elements.

In a particular embodiment, the percentage of the security marker of the present invention incorporated in the security document or article is less than 10%, preferably less than 5% by weight, more preferably less than 1% by weight, and greater than 0.005% by weight with respect to the total weight of the security document or article or object of value. This low concentration hinders identification of the composition of the security marker using techniques used in the state of the art such as chemical analysis, x-ray diffraction, spectroscopic techniques or the like.

The security marker of the present invention is always active, and it is impossible for it not to show the bands corresponding to the Raman spectrum characterizing it (characteristic Raman signal in the Raman shift range of 1000-2250 $cm^{-1}$ by the application of electromagnetic waves or other external electric, magnetic, light, or temperature fields, particularly the application of monochromatic laser radiation with a wavelength between 600 and 1100 nm; preferably a 785 nm laser.

Likewise, the Raman response of the materials comprised in the security marker of the present invention cannot be modified without destroying the security document, article, or element or the object of value of which they are an integral part, therefore the security compositions are characterized by being permanent and not being susceptible to deactivation.

The marker of the invention is formed by stable materials, generally not being sensitive to oxidation or hydration processes. Nevertheless, it can sometimes be coated with layers of inert materials to protect it from the environment. The marker could also be coated with polymers or other organic materials to improve its adherence, for example, to the fibers of the paper, or for better transmission in the event that it is part of inks.

The marker described in the present invention allows effectively marking security articles or documents or objects of value, having a secure coding system. The security marker described in the present invention is preferably permanent, not susceptible to deactivation, and has a coded response which requires the use of a detection system designed for such purpose.

The method of preparing the security article, document, or element or the object of value relates to the preparation of said security article, document, or element or the object of value in a general or individual manner.

Method for Determining the Authenticity of the Security Article, Document, or Element or the Object of Value In another aspect, the invention relates to a method for determining the authenticity of a security article, security document, or security element or the object of value, said method comprises measuring the Raman spectrum of said security article, document, or element or object of value to determine the presence of the security marker of the present invention.

In a particular embodiment, the invention relates to a method for determining the authenticity of a security article, security document, or security element or an object of value comprising the security marker of the present invention in any of its particular embodiments, said method comprises:
i. irradiating the security article, document, or element or the object of value with monochromatic laser radiation with a wavelength between 600 and 1100 nm; and
ii. measuring the Raman spectrum of said security article, document, or element or object of value to determine the presence of the security marker of the present invention.

In a particular embodiment, the monochromatic laser radiation suitable for the present invention is in the wavelength range between 600 and 1100 nm; preferably between 700 and 800 nm; more preferably at 785 nm.

The monochromatic laser radiation reaching the security article, document, or element or the object of value interacts with the security marker of the present invention, and said security marker emits radiation with frequencies other than the incident radiation frequency. Said radiation emitted by the security marker is a signal or signals that can be detected by means of Raman spectroscopy comprising a significant signal which is in the Raman shift range of 1000-2250 $cm^{-1}$ of the Raman spectrum. Preferably said signal in the Raman shift range of 1000-2250 $cm^{-1}$ of the Raman spectrum can be broken down into multiple bands using means suitable for deconvoluting said bands. Said Raman signal is unique and particular for the specific security marker used in said security article, document, or element or object of value and is therefore considered a reference for use in the authentication of security articles, documents, or elements or objects of value.

In a particular embodiment, the method for determining the authenticity of a security article, security document, or security element or object of value comprising the security marker of the present invention in any of its particular embodiments, comprises:
(a) irradiating said security article, document, or element or object of value with monochromatic laser radiation with a wavelength between 600 and 1100 nm; and
(b) measuring the Raman spectrum of said security article, document, or element or object of value to determine the presence of the security marker of the present invention.

In a preferred embodiment, the monochromatic laser radiation has a wavelength between 700 and 1000 nm; preferably around 785 nm.

In a preferred embodiment, the determination of the presence of the security marker of the present invention performed in step (b) of the method of the present invention comprises one or more of the following steps:
verifying if the Raman spectrum of said security article, document, or element or object of value comprises a signal in the Raman shift range of 1000-2250 $cm^{-1}$ of the Raman spectrum;
verifying if the Raman spectrum of said security article, document, or element or object of value comprises a signal in the 1000-2250 $cm^{-1}$ wavelength range of the Raman spectrum, deconvoluting the signal in the Raman shift range of 1000-2250 $cm^{-1}$ of the Raman spectrum; and verifying if the deconvoluted Raman signal in the Raman shift range of 1000-2250 $cm^{-1}$ of the Raman spectrum comprises at least two Raman bands the width of which at half intensity is less than 90 $cm^{-1}$; and/or
comparing the complete Raman spectrum with a reference Raman spectrum of the marker of the present invention.

In a more preferred embodiment, the determination of the presence of the security marker of the present invention performed in step (b) of the method of the present invention consists of checking for the presence or absence of a significant Raman signal in the Raman shift range of 1000-2250 $cm^{-1}$. Said method would give a yes/no response.

In the context of the present invention, "significant signal" is understood to mean a Raman signal with a given intensity. In a particular embodiment, a significant Raman signal in the Raman shift range of 1000-2250 $cm^{-1}$ has Raman mode intensity in the Raman shift region between 1000 and 2250 $cm^{-1}$, which is at least 0.5 times greater than the intensity of the Raman signal in the Raman shift region between 100 and 1000 $cm^{-1}$; preferably at least 1 time greater; more preferably at least 2 times greater.

In a more preferred embodiment, the determination of the presence of the security marker of the present invention performed in step (b) of the method of the present invention comprises:
verifying if the Raman spectrum of said security article, security document, security element, or object of value comprises a signal in the Raman shift range of 1000-2250 $cm^{-1}$ of the Raman spectrum; and
optionally deconvoluting the signal in the 1000-2250 $cm^{-1}$ wavelength range of the Raman spectrum; and verifying if the deconvoluted Raman signal in the Raman shift range of 1000-2250 $cm^{-1}$ of the Raman spectrum comprises at least two Raman bands or Raman peaks the width of which at half intensity is less than 90 $cm^{-1}$.

In an even more preferred embodiment, the determination of the presence of the security marker of the present invention performed in step (b) of the method of the present invention comprises:
verifying if the Raman spectrum of said security article, security document, or security element or the object of security comprises a signal in the Raman shift range of 1000-2250 $cm^{-1}$ of the Raman spectrum; optionally verifying if the signal in the Raman shift range of 1000-2250 $cm^{-1}$ of the Raman spectrum has an intensity value which is at least 0.5 times greater than the intensity value of the most intense Raman signal obtained in the range of 100 to 1000 $cm^{-1}$, and
optionally deconvoluting the signal in the Raman shift range of 1000-2250 $cm^{-1}$ of the Raman spectrum; and verifying if the deconvoluted Raman signal in the Raman shift range of 1000-2250 $cm^{-1}$ of the Raman spectrum comprises at least two peaks the width of which at half intensity is less than 90 $cm^{-1}$.

In a more preferred embodiment, the determination of the presence of the security marker of the present invention performed in step (b) of the method of the present invention comprises comparing the complete Raman spectrum with a complete reference Raman spectrum; wherein the reference Raman spectrum corresponds to the Raman spectrum of the security marker of the present invention.

In an even more preferred embodiment, the comparison performed in step (b) of the method of the present invention consists of comparing the complete Raman spectrum with a complete reference Raman spectrum; wherein the reference Raman spectrum corresponds to the Raman spectrum of the security marker of the present invention; wherein the presence and characteristics of the Raman signal in the Raman shift range of 1000-2250 $cm^{-1}$ are compared in particular; preferably, the half width and shape of the Raman signal in the 1000-2250 $cm^{-1}$ wavelength range are compared. To compare the specific characteristics of the Raman signal in the Raman shift range of 1000-2250 $cm^{-1}$, it is possible to perform decomposition of said signal; for example deconvolution of said signal.

In an even more preferred embodiment, the comparison performed in step (b) of the method of the present invention comprises comparing the presence and characteristics of the Raman signal in the Raman shift range of 1000-2250 $cm^{-1}$; preferably, the width and shape of the Raman signal in the Raman shift range of 1000-2250 $cm^{-1}$ are compared.

In a more particular embodiment, the reference Raman spectrum is the Raman spectrum of the security marker of the present invention and comprises a Raman signal in the Raman shift range of 1000-2250 $cm^{-1}$.

Preferably, the Raman signal in the Raman shift range of 1000-2250 $cm^{-1}$ of the security marker of the present invention has an intensity value which is at least 0.5 times greater than the intensity value of the most intense Raman signal obtained in the range of 100 to 1000 $cm^{-1}$ of the Raman spectrum of the security marker of the present invention; more preferably the intensity value is at least 1 time greater; even more preferably it is at least 2 times greater. In a particular embodiment, said Raman signal in the Raman shift range of 1000-2250 $cm^{-1}$ comprises Raman bands or peaks having a greater intensity than the most intense Raman signal obtained in the range of 100 to 1000 $cm^{-1}$.

The authenticity of the security article, security document, or security element or the object of value is confirmed after verifying one or more of the following conditions:

the presence or absence of a significant Raman signal in the Raman shift range of 1000-2250 $cm^{-1}$; optionally if the signal in the Raman shift range of 1000-2250 $cm^{-1}$ of the Raman spectrum has an intensity value which is at least 0.5 times greater than the intensity value of the most intense Raman signal obtained in the range of 100 to 1000 $cm^{-1}$, and optionally if the deconvolution of the signal in the Raman shift range of 1000-2250 $cm^{-1}$ of the Raman spectrum comprises at least two Raman peaks the width of which at half intensity is less than 90 $cm^{-1}$; or if the Raman spectrum obtained in step (b) coincides with the reference Raman spectrum of the security marker, or if it is within pre-established limits.

According to another particular embodiment, the Raman spectrum obtained after monochromatic laser radiation strikes the security element, document, or article or the object of value represents a code. Preferably, said code comprises a Raman signal in the Raman shift range of 1000-2250 $cm^{-1}$; more preferably it comprises a Raman signal in the Raman shift range of 1000-2250 $cm^{-1}$ together with another series of defined Raman signals, preferably Raman signals characteristic of the second crystalline phase of the security marker.

In a preferred embodiment, the determination of the presence of the security marker of the present invention performed in step (b) of the method of the present invention comprises verifying if the Raman spectrum of said security article, security document, security element, or object of value comprises a signal in the Raman shift range of 1000-2250 $cm^{-1}$ of the Raman spectrum; optionally verifying if the signal in the Raman shift range of 1000-2250 $cm^{-1}$ of the Raman spectrum has an intensity value which is at least 0.5 times greater than the intensity value of the most intense Raman signal obtained in the range of 100 to 1000 $cm^{-1}$;

deconvoluting the signal in the Raman shift range of 1000-2250 $cm^{-1}$ of the Raman spectrum, giving rise to a set of deconvoluted Raman peaks;

assigning an alphanumerical value for the set of deconvoluted Raman peaks in the Raman shift range between 1000 and 2250 $cm^{-1}$; and comparing said value with an alphanumerical value assigned for the set of deconvoluted Raman peaks in the Raman shift range between 1000 and 2250 $cm^{-1}$ establish of the marker of the present invention.

System for Determining the Authenticity of the Security Article, Security Document, or Security Element or the Object of Value To obtain the Raman spectrum of the security article, security document, or security element or the object of value, a detection system comprising a source of monochromatic radiation, for example a laser emitting at a wavelength between 600 and 1100 nm, preferably at 785 nm, can be used. A detection system is necessary to detect the emitted radiation, given that the intensity of the Raman signals is several orders of magnitude smaller than the fluorescence emission intensity for any material and much less intense than that of the incident light laser, filters which allow blocking laser radiation must be used. Furthermore, the detection system comprises a monochromator for picking up the intensity of the Raman signals at different frequencies or wavelengths, as well as a suitable optical system.

One aspect of the present invention relates to a system for determining the authenticity of the security article, security document, or security element or the object of value of the invention as defined above comprises:

a positioner in which the security document, security article, security element, or object of value is placed;

a lens array which allows focusing the light from the source of monochromatic laser radiation on the part of the security article, document, or element or the object of value to be irradiated;

a Raman spectrum multi-channel detector;

a filter for blocking laser radiation reaching the multi-channel detector, and coming directly from the emitting laser source; and optionally, means adapted for processing the Raman spectrum; preferably for deconvoluting the signals of said spectrum.

In a particular embodiment, the detection system for detecting the Raman spectrum is compact, assuring that all the elements are well aligned. To that end, a microscope can be used. The excitation laser light thereby strikes through a microscope lens, and the scattered signal is picked up using the same objective. Using a microscope objective of a low magnifying power (5× or 10×), the Raman spectrum of a region of about 1 mm in diameter can be measured. This way of obtaining the Raman spectrum is suitable for cases wherein the security marker of the present invention is located in a specific region of the security article, security document, or security element or the object of value. In the event that said security marker is not located in a specific region, a system for moving over said security article, document, or element or object of value can be included, such that it can be located on same by Raman signal mapping.

In a preferred embodiment, the detection system used for detecting the Raman spectrum comprises a multi-channel detector. Detectors of this type allow obtaining the Raman spectrum just once, which prevents having to perform frequency or wavelength scanning over time, which facilitates review of the Raman spectrum, locating the required Raman peaks in very short times. Therefore, the use of detectors of this type allows authenticating security articles, documents, or elements at high speeds.

In a preferred embodiment, the system comprises a source of monochromatic laser radiation; preferably in the 600-1100 nm wavelength range; more preferably at 785 nm.

In a preferred embodiment, the multi-channel detector is a detector commonly known as CCD.

In a particular embodiment, the system of the present invention comprises means adapted for processing the Raman spectrum; preferably for deconvoluting the signals of said spectrum.

In another particular embodiment, this system further comprises a device which allows verifying:

the presence or absence of a significant Raman signal in the Raman shift range of 1000-2250 $cm^{-1}$; optionally if the signal in the Raman shift range of 1000-2250 $cm^{-1}$ of the Raman spectrum has an intensity value which is at least 0.5 times greater than the intensity value of the most intense Raman signal obtained in the range of 100 to 1000 $cm^{-1}$, and optionally if the deconvolution of the signal in the Raman shift range of 1000-2250 $cm^{-1}$ of the Raman spectrum has at least two peaks the width of which at half intensity is less than 90 $cm^{-1}$; or if the Raman spectrum obtained in step (b) coincides with the reference Raman spectrum of the security marker, or if it is within pre-established limits; and thus verifying if the security article, security document, or security element or the object of value analyzed comprises the security marker of the present invention.

In the event that the security marker described in the present invention is used for binary images or barcodes, the detection system comprises an optical focus system, a suitable imaging system, and two filters which allow the passage therethrough of only the wavelength of the Raman peak corresponding to each of the inks. In this case, since said image is in a well-defined region of the security document, the measurement is taken only in this region

EXAMPLES

The invention is described below by means of the following examples which must be considered merely illustrative and by no means limiting of the scope of the present invention.

Example 1: Synthesis of Raman Markers Comprising Anorthite-Phase Feldspar Crystallizations A series of samples S1-S8 were synthesized by means of different thermal treatments comprising anorthite-phase feldspar [$CaAlSi_2O_8$] crystals.

To synthesize said samples, an initial mixture (called M1) of kaolin ($Al_2Si_2O_5(OH)_4$) was prepared with $CaCO_3$ as follows. Kaolin or kaolinitic or kaolinite clay was used as starting material, said material being a milled mineral having an average particle size value $d_{50}$=13.2 μm and a chemical composition expressed in % by weight of equivalent oxides once losses on ignition of 55.5% $SiO_2$, 42.5% of $Al_2O_3$, 1.2% $K_2O$, and the remaining minor components with an overall percentage <1% by weight of $TiO_2$, $Fe_2O_3$, $P_2O_5$, MgO, PbO, have been deducted. The initial reagents were not subjected to prior treatment.

Mixture M1 was prepared from a suspension of:
9.28 g of kaolin;
3.60 g of $CaCO_3$; and
⅓ by volume of absolute ethanol
which was treated by means of attrition milling for 3 h using balls 2 mm in diameter with composition of yttria-stabilized zirconia in an absolute ethanol medium (99.9% purity). After the milling, the milling balls were removed by means of a mesh with a 500 μm mesh size opening, and the resulting suspension was dispersed at a high shear speed (IKA Ultraturrax T50), at 10000 rpm for 10 min. The resulting suspension was oven-dried at 60° C. for 2 hours, yielding 10 g of a powdery material which was sieved using a mesh with a 100 μm mesh size opening yielding mixture M1.

To obtain samples S1-S8, the following thermal treatments were performed on mixture M1:

Thermal Treatment 1
A thermal treatment was performed at 1180° C. for 2 hours using a heating and cooling rate of 5° C./min on the mixture (M1) described above. Ignited mixture M1 was milled by attrition for 3 hours using ethanol and yttria-stabilized zirconia ball mill and was then oven-dried at 60° C. for 4 hours and sieved using a mesh with a 100 μm mesh size opening to yield a composition of $CaAlSi_2O_8$ called synthetic anorthite. Said composition was pressed in a Nanetti-type uniaxial pressing device by means of a pressure of 40 MPa, forming discs 2 cm in diameter and 2 mm in thickness which were sintered at different times and temperatures:

1220° C. for 6 minutes to yield the sample called S1,
at 1220° C. for 6 minutes followed by 1000° C. for 50 hours (S2), and
at 1000° C. for 50 hours (S3).

Thermal Treatment 2
Reactive sintering was performed on the milled mixture (M1) described above at 1220° C. for 6 hours (S4) and at 1150° C. for 50 hours (S5).

Thermal Treatment 3
The SPS (spark plasma sintering) method was used to sinter the mixture (M1) described above by means of a DR. SINTER SPS-1050-C furnace. Said method consisted of performing thermal treatment by means of electrical pulses which allow rapid heating of the sample at rates of ≥20° C./min. Sintering was performed using a pressure of 100 MPa at temperatures of 900° C. for 10 minutes (S6), 1000° C. for 10 minutes (S7), and 1000° C. for 2 h (S8).

The Raman spectrum of samples S1-S8 is shown in FIG. 1. All samples S1-S8 have significant Raman signals in the Raman shift range between 1000 and 2250 $cm^{-1}$ (FIGS. 1 $a$, $b$, and $c$). From the results shown in FIG. 1, it can be observed that the intensity values of the Raman bands obtained in the Raman shift range between 1000 and 2250 $cm^{-1}$ for samples S1-S5 are greater than the intensity values of the signals obtained between 0 and 1000 $cm^{-1}$. More specifically, the ratio/proportion between the intensity values of the signals obtained in the Raman shift range between 1000 and 2250 $cm^{-1}$ and the intensity of the signals in the range of 250 to 500 $cm^{-1}$ are in the range between 8.7 and 13.4 and between 0.8 and 2.2 for samples S1-S5 and S6-S8, respectively.

The scanning electron microscopy (FESEM Hitachi S-4700) images of samples S1-S3 are shown in FIG. 2. FIG. 2 shows that the microstructure of samples S1-S3 is made up of crystalline regions formed by 100-200 nm particles which in turn are made up of nanometer sized structural elements (FIGS. 2 $a$, $d$, and $f$), embedded or assembled in glassy regions. Samples S1-S3 furthermore have an interface between the crystalline phase and the glassy phase. Furthermore, the glassy phase/crystalline phase proportion is different in each of samples S1-S3, therefore yielding a different interface volume. This characteristic microstructure is related to the Raman signal between 1000 and 2250 $cm^{-1}$ of said samples.

The diffractograms obtained by x-ray diffraction (Bruker D8 Advance with Cu Kα radiation, 40 kV and 40 mA) of samples S6-S8 of FIG. 3 showed the presence of crystalline phases of anorthite (A), quartz (S), and $CaCO_3$ (C) in sample S6, and of gehlenite (G) and anorthite in S7 and S8.

Therefore, the present example shows obtaining markers having a strong signal between 1000 and 2250 $cm^{-1}$ in their Raman spectrum. These markers S1-S8 have the same chemical composition and different crystalline phase, glassy phase, and interface proportions in their micro/nanostructure, so even though they all exhibit a significant signal between 1000 and 2250 $cm^{-1}$ in their Raman spectrum, said signal varies in intensity and in the relative position of the Raman bands forming it between 1000 and 2250 $cm^{-1}$.

Example 2: Synthesis of Raman Markers Comprising Albite-Phase Feldspar Crystallizations A series of samples S9-S16 were synthesized by means of different thermal treatments comprising albite-phase feldspar crystals (with nominal composition $NaAlSi_3O_8$).

Samples S9-S11 were prepared from a mixture M2 formed by frit and kaolin (described in Example 1). The frit used in the preparation of the samples has the composition described in Table 1 and was prepared by melting a mixture of minerals at >1500° C. in a furnace in an alumina crucible, corresponding to methods commonly used for obtaining ceramic frits. The molten mass was cooled abruptly in water. The result is a fragmented glassy material.

TABLE 1

Chemical composition of the albite precursor frit expressed in % by weight of equivalent oxides

| Equivalent oxide (% by weight) | $SiO_2$ | SrO | $Na_2O$ | $K_2O$ | $Al_2O_3$ | ZnO | CaO | Others* |
|---|---|---|---|---|---|---|---|---|
| Frit composition | 51.63 | 8.05 | 2.68 | 1.46 | 21.14 | 1.10 | 10.47 | 3.48 |

*Others: $TiO_2$, $Fe_2O_3$, $P_2O_5$, MgO, PbO each less than 1% by weight.

In the preparation of mixture M2, 180 grams of frit were mixed with 20 grams of kaolin by milling in a porcelain jar rapid mill. Said milling was carried out for 20 minutes, using alumina balls 1-2 cm in diameter and in a liquid medium (100 g consisting of water and carboxylic acid at 0.4% by weight with respect to the proportion of solids). After milling, the milling balls were removed and the resulting suspension was sieved through a 63 μm mesh, obtaining a reject of less than 3% by weight of dry residue. The resulting suspension was oven-dried at 80° C. for 6 hours. The dry powder was sieved using a mesh with a 100 μm mesh size opening yielding mixture M2.

Mixture M2 was dispersed in water and deposited by an airless gun on a standard porcelain support, yielding a layer with a thickness of 600 μm, and dried, and then it was fired in a standard ceramic tile rapid fire kiln with a total firing cycle duration of 55 minutes and reaching a maximum temperature of 1220° C. for 6 minutes. This sample is referred to as sample S9.

Mixture M2 was pressed in a uniaxial pressing device at 40 MPa into the form of discs 2 cm in diameter and 2 mm in thickness and was sintered in the same cycle described for sample S9, yielding sample S10 which corresponds to a ceramic sample. Sample S10 was milled in a tungsten carbide mill to reach a particle size with a value of $d_{50}<10$ μm and thus obtain sample S11.

Samples S12-S13 were prepared from a mixture M3 made up of frit, kaolin (described in Example 1), and europium oxides ($Eu_2O_3$). Mixture M3 was prepared following the method described mixture M2. In this case, during the metering of the mixture there was added 1% by weight in excess with respect to the solid content of $Eu_2O_3$ with a particle size of $d_{50}=3$ μm, purity of 99.5%, obtaining mixture M3. Sample S12 was prepared following a method similar to the corresponding method for sample S10 from mixture M3. Sample S13 was prepared by milling in a tungsten carbide mill to reach a particle size with a value of $d_{50}<10$ μm from sample S12.

Samples S9-S13 are characterized by presenting 60% by weight of a crystalline phase with an albite structure and crystals with sizes between 20 and 150 nm. The presence of glassy phase in content by volume between 3 and 20% was determined in the samples. FIG. 4 shows a transmission electron microscopy image of sample S10 wherein the albite crystals are embedded and dispersed in the glassy matrix. The glassy phase is in contact with the surface of the crystalline particles, generating the interface. In said interface, the crystalline structure and the glassy phase sustain structural stresses generated during thermal treatment due to differences in the coefficient of thermal expansion of both materials. Said structural stresses cause deformation of the crystal lattice in the interface that affects vibrational mode polarization.

The coefficient of thermal expansion, CTE, of sample S10 in the range of 0 to 300° C. was determined by means of dilatometry (Netzsch horizontal dilatometer), the value of which was $5.9 \times 10^{-6}$ $K^{-1}$. This value is less than that corresponding to the mixture of both materials present: typically the CTE value for a plagioclase with 60% albite is $14 \times 10^{-6}$ $K^{-1}$ and for a sodium-aluminous glass it is $8.6 \times 10^{-6}$ $K^{-1}$. A lower CTE of the sample combining plagioclase nanocrystals with a majority percentage of albite and a glassy phase is attributed to the existence of an interface between both phases wherein the structural stresses arising during the cooling step of the thermal treatment relax.

Samples S14-S16 were prepared from a mixture M4 of $Na_2CO_3$, $Al_2O_3$, and $SiO_2$. Said mixture was prepared following a method similar to that of mixture M1 using an initial composition comprising:

2.02 g of $Na_2CO_3$;
1.94 g of $Al_2O_3$ (99% Sigma Aldrich);
6.87 g of $SiO_2$; and
⅓ by volume of absolute ethanol (99.9%)

Different thermal treatments were performed on pressed discs made from mixture M4 at 1000° C., at 1100° C., and at 1200° C. to yield samples S14, S15, and S16, respectively. In the thermal treatments of samples S14-S16, the temperature was maintained for 2 hours and heating and cooling rates were 5° C./min.

The results of the Raman spectra measured for samples S9-S16 are shown in FIGS. 5a and 5b. All samples S9-S16 have Raman signals with a high intensity in the Raman shift range between 1000 and 2250 $cm^{-1}$. Although the compositions of samples S9-S13 are the same, both the variations in the thermal treatment and the milling step cause a change in the shape of the Raman spectrum (FIG. 5b). The Raman spectra corresponding to unsintered powder (S11 and S13) have broader and less defined bands. The Raman spectra of samples S9-S13 in the wavelength range between 1000 and 2250 $cm^{-1}$ are different from the Raman spectra of samples comprising anorthite phase). The ratio/proportion between the intensity values of the signals obtained in the Raman shift range between 1000 and 2250 $cm^{-1}$ and those of the signals in the range of 250 to 500 $cm^{-1}$ are 2.1-3.6 for S10 and S12 and 4.2-7.6 for sintered samples S11 and S13.

The present example shows that Raman markers containing $Eu_2O_3$ have Raman bands corresponding to the structure of the sesquioxide $Eu_2O_3$ in the Raman structure and vibrational mode region (FIG. 5a). Furthermore, the presence of $Eu^{3+}$ cations yields an additional characteristic photoluminescence signal. The incorporation of rare earths thereby provides an additional signal by Raman spectroscopy to the shift signal in the Raman shift range between 1000 and 2250 $cm^{-1}$, or an additional luminescence signal for determining the nature of the Raman marker.

Therefore, the present example shows obtaining markers having a strong Raman signal between 1000 and 2250 $cm^{-1}$ and comprising albite crystallizations embedded in a glassy phase. This example further shows how different thermal treatments and compositions cause variations in the Raman bands obtained in the Raman shift range between 1000 and 2250 $cm^{-1}$.

Example 3: Synthesis of Raman Markers from Sodium Feldspar and/or Potassium Feldspar Type Raw Materials A series of samples S17-S36 were prepared from potassium feldspar and sodium feldspar of mineral origin. Table 2 summarizes the composition in terms of % by weight of the respective equivalent oxides of the main elements present in the starting materials. The rest of the elements are minor elements with a content less than 1% by weight.

TABLE 2

Chemical composition of the sodium feldspar and potassium feldspar starting materials

|  | $SiO_2$ | $Al_2O_3$ | $Fe_2O_3$ | $TiO_2$ | CaO | MgO | $Na_2O$ | $K_2O$ |
|---|---|---|---|---|---|---|---|---|
| Sodium feldspar | 69.00 | 19.20 | 0.40 | 0.03 | 0.61 | 0.05 | 10.40 | 0.20 |
| Potassium feldspar | 66.90 | 17.30 | 0.03 | 0.02 | 0.03 | 0.01 | 0.79 | 14.29 |

Samples S17 and S18 were obtained by milling the starting feldspars (sodium and potassium feldspar, respectively) as follows: the feldspars were milled for 20 minutes in an alumina ball porcelain jar rapid mill 1 to 2 cm in diameter, and in aqueous medium with a solid concentration of 65% by weight. The resulting ceramic slip was oven-dried at 60° C. for 24 hours obtaining samples S17 and S18 formed by particles with a diameter $d_{50}$<15 µm formed by smaller sized particle agglomerates. The Raman spectrum of samples S17 and S18 (FIG. 6) has a fluorescent background signal and absence of Raman bands in the Raman shift regions between 1000 and 2250 cm$^{-1}$ which, once deconvoluted, exhibit a half width less than 90 cm$^{-1}$. As for their microstructure, it was observed by electron microscopy (not shown) that samples S17 and S18 have feldspar crystalline phases without glassy phase. Therefore, samples S17 and S18 would be representative of feldspar crystalline phases minerals wherein the aluminum cations tend to be located at positions $T_1(0)$ of the feldspar structure. These samples do not exhibit a Raman signal in the Raman shift range between 1000 and 2250 cm$^{-1}$.

Milled samples S17 and S18 in powder form were subjected to thermal treatment at 1100° C. for two hours (heating rate of 10° C./min and cooling rate according to furnace for 5 hours), yielding samples S19 and S20, respectively. The Raman spectrum shown in FIG. 6 for samples S19 and S20 shows a Raman signal with Raman peaks in the shift range between 1000 and 2250 cm$^{-1}$. After subtracting the fluorescent contribution, the intensity ratio of the modes in the Raman region and shift between 1000 and 2250 cm$^{-1}$ with respect to the intensities of the Raman modes corresponding to structure and vibrational modes in the Raman shift range between 250 and 500 cm$^{-1}$ which was 1.3 and 2.5 for samples S19 and S20, respectively, i.e., a lower intensity ratio than for samples comprising anorthite from the preceding example.

Moreover, initial sodium and potassium feldspars were subjected to milling processes in a planetary mill (Fritsch Pulverisette 6) at 300 rpm with 20 mm WC balls and mortars for times of 1, 1.5, 2, and 4 h, yielding for the sodium feldspars the series of samples S21, S22, S23, and S24, respectively, the Raman spectra of which are shown in FIG. 7a, and for the sodium feldspars samples S25, S26, S27 and S28 milled for 1, 1.5, 2, and 4 h, respectively, the Raman spectra of which are shown in FIG. 7b. Samples S21-S28 are characterized by a decrease in particle size, having particles with $d_{50}$<10 µm and a proportion of 10% of particles with sizes less than 1 µm. Likewise, samples S21-S28 are characterized by presenting x-ray diffraction diffractograms corresponding to the crystalline phases of starting feldspars and absence of glassy phase. The Raman spectra of FIG. 7 have a fluorescent background signal and absence of defined Raman bands in the Raman shift regions between 1000 and 2250 cm$^{-1}$. It should be pointed out that, as will be seen in the last example, once said Raman signals have been deconvoluted, they do not exhibit a half width less than 90 cm$^{-1}$. Therefore, this experiment demonstrated that by starting from a crystalline feldspar material, it is not possible to modify its microstructure by mechanical treatment such that it yields a significant Raman signal in the Raman shift regions between 1000 and 2250 cm$^{-1}$.

Sample S22 was subjected to thermal treatment at maximum treatment temperatures of 1000° C. and 1100° C. for 10 hours at heating and cooling rates of 10° C./min, yielding samples S29 and S31. Similarly to sample S24, it was treated at 900° C. and 1000° C. for 10 hours to obtain samples S30 and S32; sample S27 was treated at 1000° C. and 1100° C. for 10 hours to obtain samples S33 and S35; and sample S29 was treated at 900° C. and 1000° C. for 10 hours to obtain samples S34 and S36. The Raman spectra of samples S29 and S30 are shown in FIG. 8a, of samples S31 and S32 in FIG. 8b, of samples S33 and S34 in FIG. 8c, and of samples S35 and S36 in FIG. 8d.

As shown in FIG. 8, the Raman spectra of samples S29-S36 have a strong Raman signal in the Raman shift range between 1000 and 2250 cm$^{-1}$. Furthermore, the intensity ratio between the Raman bands located between 1000 and 2250 cm$^{-1}$ and the Raman bands located between 0 and 1000 cm$^{-1}$ is in the range of 4.5 to 7.2 for the Raman spectra of samples S29, S31, S33, and S35, and in the range of 9.9 to 11.3 for the Raman spectra of samples S30, S32, S34, and S36. Therefore, it can be observed that the intensity ratio increases as the sintering temperature decreases. In FIG. 8, it can be observed that there is a variation in the intensity and in the shape of the Raman bands in the Raman shift range between 1000 and 2250 cm$^{-1}$, for samples subjected to thermal treatment which is sensitive to the composition and to the thermal treatment followed in the preparation of the samples.

As for their microstructure, samples S29-S36 comprise feldspar crystalline phases with particle sizes comprised between 50-200 nm embedded in a glassy phase. Therefore, the present example shows obtaining security markers from sodium and potassium feldspars with Raman signals in the Raman shift range between 1000 and 2250 cm$^{-1}$ obtained after high-energy mechanical milling treatments and a thermal treatment.

Samples S19-S20 and S29-S36 comprise feldspar crystalline phases embedded in a glassy phase, wherein said glassy phase is at a percentage by weight between 20% and 80% depending on the thermal treatment performed. Furthermore, the feldspar crystalline phases in said samples are in the submicrometer range, <1000 nm, with sizes comprised between 10 nm and 500 nm. The proportion of nanometric phases with a feldspar structure with respect to glassy matrix, their state of dispersion in the glassy matrix, and the size of the feldspar phase nanostructures are dependent on the mechanical process of the starting materials, chemical composition, and thermal treatment to which the samples are subjected. By way of example, FIG. 9 shows the micro-nanostructure of samples S32 and S36, which have been treated at 1000° C. for 10 hours and are based on potassium feldspar mineral milled in a WC mill for 1.5 and 4 hours, respectively. The micro-nanostructure of sample S32 (FIG. 9a) comprises particles with sizes comprised between 20 and 500 nm agglomerated and embedded in the glassy matrix. The micro-nanostructure of sample S36 (FIG. 9b) comprises particles with sizes comprised between 10 and 400 nm dispersed in the glassy matrix. These two samples have a significant Raman signal in the Raman shift range between 1000 and 2250 cm$^{-1}$.

These results show that the characteristics of the microstructure, such as the degree of crystallinity and the distribution of crystalline phase in the glassy phase matrix modify the characteristics of the Raman signal. Therefore, modulation of the chemical composition of the samples and their thermal treatment allows modulating the Raman signal of said markers in the Raman shift range between 1000 and 2250 cm$^{-1}$.

TABLE 3

Summary of the occurrence of Raman signals in the Raman shift range between 1000 and 2250 cm$^{-1}$ depending on the composition and the treatment followed for the samples obtained from feldspar minerals.

| Samples | Material | Treatment | Significant Raman signal 1000-2250 cm$^{-1}$ |
|---|---|---|---|
| S17 | Sodium | Porcelain jar milling | NO |
| S19 | feldspar NaAlSi$_3$O$_8$ | Porcelain jar milling + 1100° C. - 2 h | YES |
| S21 | | Milled in WC mill 1 hour | NO |
| S22 | | Milled in WC mill 1.5 hours | NO |
| S23 | | Milled in WC mill 2 hours | NO |
| S24 | | Milled in WC mill 4 h | NO |
| S29 | | S22 treated at 1000° C. 10 h | YES |
| S31 | | S22 treated at 1100° C. 10 h | YES |
| S30 | | S24 treated at 900° C. 10 h | YES |
| S32 | | S24 treated at 1000° C. 10 h | YES |
| S18 | Potassium | Porcelain jar milling | NO |
| S20 | feldspar KAlSi$_3$O$_8$ | Porcelain jar milling 1100° C. - 2 h | YES |
| S25 | | Milled in WC mill 1 h | NO |
| S26 | | Milled in WC mill 1.5 h | NO |
| S27 | | Milled in WC mill 2 h | NO |
| S28 | | Milled in WC mill 4 h | NO |
| S33 | | S27 treated at 1000° C. 10 h | YES |
| S35 | | S27 treated at 1100° C. 10 h | YES |
| S34 | | S29 treated at 900° C. 10 h | YES |
| S36 | | S29 treated at 1000° C. 10 h | YES |

Example 4: Synthesis of Markers from Alumina and Silico-Sodium-Calcium-Aluminous Glass A series of samples were prepared from silico-sodium-calcium-aluminous glass, silico-sodium-calcium-aluminous glass and nanoalumina (S39-S50), and silico-sodium-calcium-aluminous glass and γ-alumina (S51-S62) in different proportions. The composition of the samples refers to the % by weight of each compound in the starting mixture following the example: 90/10 glass/nanoalumina indicates a proportion of 90 grams of milled glass and 10 grams of nanoalumina. The silico-sodium-calcium-aluminous glass corresponding to sample S37 in the form of microscopy slide-type planar specimens which presented a composition obtained by x-ray fluorescence (XRF) and expressed in % of oxide equivalents of: 69.7 SiO$_2$; 12.4 Na$_2$O; 7.22 CaO; 5.45 Al$_2$O$_3$; 4.06 MgO; 0.5 K$_2$O; 0.31 ZrO$_2$; 0.13 B$_2$O$_3$; 0.12 Fe$_2$O$_3$ and other minor oxides with a presence <0.1%. Sample S37 was milled in a high-energy WC ball mill for 1 hour to obtain sample S38 in the form of powder with a particle size d$_{50}$<20 μm. Nanometric powders of α-Al$_2$O$_3$ phase with a purity of 99.9% and a size d$_{50}$ of 80 nm were used as nanoalumina. Powders having a purity of 99.9% and a primary particle size of 20 nm were used as γ-Al$_2$O$_3$ phase, forming spherical agglomerates 10-20 μm in diameter. Both aluminas are crystalline phases and characterized by not presenting a significant Raman signal in the Raman shift range between 1000 and 2250 cm$^{-1}$.

Sample S37 was subjected to thermal treatment at 900° C., and after that said sample exhibits a significant Raman signal in the Raman shift range between 1000 and 2250 cm$^{-1}$ The mixtures were obtained by dry milling in a Mixer/Mill 8000 using PA66 type nylon jars and cerium-stabilized zirconia balls 1 mm in diameter. The milling process was maintained for 30 minutes to obtain mixtures M5. The mixtures were sieved using a 100 μm mesh to remove the balls, and the resulting powder was subjected to thermal treatment with a heating and cooling rate of 3° C./min. Table 4 summarizes the composition and the mechanical and/or thermal treatment to which each sample was subjected and the presence of a significant Raman signal in the Raman shift range between 1000 and 2250 cm$^{-1}$.

TABLE 4

Composition ratio, thermal treatment, and Raman response for glass/alumina mixtures.

| Samples | Material | Thermal treatment | Significant Raman signal 1000-2250 cm$^{-1}$ |
|---|---|---|---|
| S39 | Glass/nanoalumina | 800° C. - 2 h | YES |
| S40 | 90/10 | 900° C. - 2 h | YES |
| S41 | | 1000° C. - 2 h | YES |
| S42 | | 1100° C. - 2 h | YES |
| S43 | Glass/nanoalumina | 800° C. - 2 h | YES |
| S44 | 75/25 | 900° C. - 2 h | YES |
| S45 | | 1000° C. - 2 h | YES |
| S46 | | 1100° C. - 2 h | YES |
| S47 | Glass/nanoalumina | 800° C. - 2 h | YES |
| S48 | 10/90 | 900° C. - 2 h | YES |
| S49 | | 1000° C. - 2 h | YES |
| S50 | | 1100° C. - 2 h | YES |
| S51 | Glass/γ-alumina | 800° C. - 2 h | YES |
| S52 | 25/75 | 900° C. - 2 h | YES |
| S53 | | 1000° C. - 2 h | YES |
| S54 | | 1100° C. - 2 h | YES |
| S55 | Glass/γ-alumina | 800° C. - 2 h | YES |
| S56 | 50/50 | 900° C. - 2 h | YES |
| S57 | | 1000° C. - 2 h | YES |
| S58 | | 1100° C. - 2 h | YES |
| S59 | | 800° C. - 2 h | YES |
| S60 | Glass/γ-alumina | 900° C. - 2 h | YES |
| S61 | 75/25 | 1000° C. - 2 h | YES |
| S62 | | 1100° C. - 2 h | YES |

The spectra of samples S39-S62 exhibited a significant Raman signal between 1100 and 2250 cm$^{-1}$.

FIG. 10a shows the Raman spectra of samples S37-S38. It should be pointed out that although a significant Raman signal is shown in said spectra between 1100 and 2250 cm$^{-1}$, after deconvolution of said signal, this signal exhibit Raman modes in the Raman shift range between 1000 and 2250 cm$^{-1}$ with a half width greater than 90 cm$^{-1}$. Therefore, this characteristic of said Raman signal seems to correspond to the absence of order in the samples (glassy phase).

By way of example, the Raman spectra of S44-S46 are shown in FIG. 10b and those of samples S59-S62 are shown in FIG. 10c. The Raman spectra of said examples are characterized in that the deconvolution of the significant Raman signal between 1100 and 2250 cm$^{-1}$ exhibits a combination of Raman modes with a half width greater than 90 cm$^{-1}$ and Raman modes with a half width less than 90 cm$^{-1}$. Said combination is the result of the existence of regions with an absence of order corresponding to the glassy phase and regions with an order corresponding to the crystalline particles.

Although all the samples (S39-S62) were analyzed by x-ray diffraction (DRX), FIG. 11 only shows the x-ray diffractograms, by way of example, of samples S60-S61, which exhibit the presence of 3 crystalline phases in coexistence with the glassy phase characterized by the glassy halo of the diffractogram. The crystalline phases are alumina $Al_2O_3$ due to unreacted particles of the initial mixture, and two aluminum silicates which were identified as nepheline and albite (feldspar). Therefore, these samples comprise a coexistence of phases with a crystalline structure such as albite (feldspar type) and with a nepheline structure (feldspathoid type) embedded in a glassy matrix.

As shown by the results, samples S39-S62 exhibit the coexistence of feldspar and feldspathoid type crystalline phases formed in a glassy matrix during thermal treatment together with crystalline phase residues corresponding to the initial materials. The feldspar and feldspathoid crystalline phases are dispersed in a glassy matrix and have particle sizes between 40 and 400 nm. By way of example, FIG. 12 shows the scanning electron microscopy image of sample S61 with a microstructure formed by crystalline particles with sizes between 40 and 400 nm dispersed in a glassy matrix coexisting with glassy phase regions without the presence of crystalline phases.

The results show that there is a modification of the bands of the Raman signal in the wavelength range between 1000 and 2250 cm$^{-1}$ of the glass (samples S37 and S38, FIG. 10a) after mixing it with nanometric alumina and performing thermal treatment, FIG. 10b. Particularly, FIG. 10b shows a well-defined narrow band appearing at 1313 cm$^{-1}$ together with other better defined bands appearing in the range of 1345 to 1395 cm$^{-1}$. Furthermore, it was observed that the proportion of $Al_2O_3$, the reactivity of alumina, and the temperature/time of the thermal treatment have an effect on the Raman response. In general, narrower and better defined bands appear for intermediate glass/alumina compositions (25/75, 50/50, and 75/25) and at sintering temperatures between 900 and 1000° C.

Therefore, the results of the present example show obtaining markers from silico-sodium-calcium-aluminous glass and different sources of aluminum oxide or alumina which exhibit significant Raman signals in the Raman shift range between 1000 and 2250 cm$^{-1}$ obtained after thermal treatment. Furthermore, said results show that it is possible to modify said signal by modifying the composition and/or thermal treatments. Furthermore, it has been observed that the modification of the microstructure (glassy phase and nanocrystalline particles) allows modulating the Raman signals obtained in the Raman shift range between 1000 and 2250 cm$^{-1}$, particularly the Raman intensity and shift. That is particularly relevant when the Raman spectrum obtained in the samples is deconvoluted.

Example 5: Synthesis of Raman Markers Combined with Rare Earth Oxides

A series of samples (S65-S66) were prepared from mixtures of silico-sodium-calcium-aluminous glass (S38) and cerium oxide (sample S63: $CeO_2$, 99.9% purity and particle size $d_{50}$=2.2 μm) and europium oxide (sample S64: europium oxide ($Eu_2O_3$) used in Example 2) in different proportions. A composition of 70% by weight of the mixture of 75/25 glass/nanoalumina and 30% by weight of S63 was also prepared and after thermal treatment, it produced samples S77 and S78. All the mixtures were prepared similarly to mixture M5 described in Example 4. Table 5 summarizes the composition and thermal treatment.

TABLE 5

Composition ratio, thermal treatment, and Raman response for glass/rare earth and glass/alumina/rare earth mixtures

| Samples | Material | Thermal treatment | Significant Raman signal 1000-2250 cm$^{-1}$ |
|---|---|---|---|
| S63 | $CeO_2$ | NO | YES |
| S64 | $Eu_2O_3$ | NO | NO |
| S65 | Glass/$CeO_2$ | 800° C. - 2 h | YES |
| S66 | 5% by mass of | 900° C. - 2 h | YES |
| S67 | $CeO_2$ | 1000° C. - 2 h | YES |
| S68 | Glass/$CeO_2$ | 800° C. - 2 h | YES |
| S69 | 15% by mass of | 900° C. - 2 h | YES |
| S70 | $CeO_2$ | 1000° C. - 2 h | YES |
| S71 | Glass/$Eu_2O_3$ | 800° C. - 2 h | YES |
| S72 | 5% by mass of | 900° C. - 2 h | YES |
| S73 | $Eu_2O_3$ | 1000° C. - 2 h | YES |
| S74 | Glass/$Eu_2O_3$ | 800° C. - 2 h | YES |
| S75 | 15% by mass of | 900° C. - 2 h | YES |
| S76 | $Eu_2O_3$ | 1000° C. - 2 h | YES |
| S77 | 70% by weight of | 900° C. - 2 h | YES |
| S78 | the 75/25 glass/nanoalumina mixture + 30% by weight of $CeO_2$ | 1000° C. - 2 h | YES |

The results show that the Raman spectrum of samples S65-S78 exhibits a significant Raman signal in the Raman shift range between 1000 and 2250 cm$^{-1}$. FIG. 13 shows Raman spectra of samples S65, S71, and S77-S78 and the spectra of rare earth oxides S63 and S64. The Raman spectra of the rare earths exhibit Raman bands with Raman shifts between 100 and 1000 cm$^{-1}$ corresponding to Raman modes of the crystalline structure (FIG. 13). Furthermore, sample S63, unlike sample S64, exhibits Raman modes associated with luminescent signals between 1000 and 2250 cm$^{-1}$.

It should be pointed out that the microstructure of the samples which comprise rare earth oxides and glass S38 and which have been subjected to thermal treatment (samples S65 to S78) is characterized by comprising crystalline particles with dimensions <500 nm similarly to the samples of Example 3 embedded in a glassy matrix. The Raman spectra of samples S65 and S71 comprising 5% by mass of cerium oxide and europium oxide, respectively (FIGS. 13a and 13b), show a significant Raman signal in the Raman shift range between 1000 and 2250 cm$^{-1}$. In said spectra, the Raman signal characteristic of each rare earth oxide is not observed; however, a signal similar to that of the glass between 1000 and 2250 cm$^{-1}$ together with a Raman band at 1313 cm$^{-1}$ linked to the presence of crystals of a nepheline-type feldspathoid crystalline phase and the presence of albite feldspar crystals are observed.

It was observed that in the samples with a higher proportion of rare earth oxides, the thermal treatment is not enough to consume all the rare earth in the feldspar type and feldspathoid type phase formation, and as a result, the obtained Raman spectra show Raman bands corresponding to the presence of said crystalline phases in addition to the Raman bands of rare earth oxides. By way of example, the Raman spectra of samples S77 and S78 described in Table 5 exhibit a significant Raman signal in the Raman shift range between 1000 and 2250 cm$^{-1}$ (FIG. 13c). It should be pointed out that upon comparison of said Raman signal of samples S77 and S78 and that of sample S63 corresponding to the corresponding rare earth oxide (FIG. 13c), it can be observed that the bands characteristic of the rare earth oxide do not appear in the Raman shift range between 1000 and 2250 cm$^{-1}$ in samples S77 and S78, but rather modified bands which do not conserve the characteristic intensity ratio of S63 do appear. Furthermore, it should be pointed out that samples S77-S78 exhibit Raman bands characteristic of the markers of the present invention which are distinguishable from the Raman bands corresponding to rare earth oxides.

Therefore, the present example shows obtaining unique Raman markers with a significant Raman signal in the Raman shift range between 1000 and 2250 cm$^{-1}$ comprising a glassy matrix, a feldspar or feldspathoid crystalline phase, and a second crystalline phase formed by rare earth oxides. It has been demonstrated that the addition of a second crystalline phase allows modifying the Raman signal of said markers, and furthermore, the addition of materials exhibiting characteristic Raman signals allows performing a second verification, for example, by means of the determination of the luminescent signal of the rare earth oxides.

Example 6. Deconvolution of the Raman Spectra of the Raman Markers of the Present Invention Once the Raman spectra of the different samples written in Examples 1-5 have been obtained, the signals obtained for the samples obtained in said examples in the Raman shift range between 1000 and 2250 cm$^{-1}$ were analyzed by means of a chemometric analysis of said signals by means of deconvoluting the Raman bands integrating the spectrum.

Deconvolution was performed in two steps. First, the noise of the Raman spectra relating mainly to fluorescence contribution was reduced. This was performed by means of subtracting the baseline in the entire spectrum. Once the noise was subtracted, the intensity of the Raman signal in the Raman shift region between 1000 and 2250 cm$^{-1}$ was evaluated for each sample. In particular, said Raman signal was considered a significant Raman signal if the intensity ratio of the Raman bands in the Raman shift region between 1000 and 2250 cm$^{-1}$ is equal to or 1.5 times greater than the intensity of the Raman signal in the Raman shift region between 100 and 1000 cm$^{-1}$.

Next, the Raman modes were deconvoluted once the noise of the signal was eliminated. For the deconvolution process, the maximums of the different Raman bands present were identified and each of them was fitted using a Gaussian-type function, Lorentzian-type function, or pseudo-Voigt-type function (a linear combination of a Gaussian function and a Lorentzian function). Once the deconvolution process has been performed, the resulting Raman bands were normalized with respect to the Raman band having a greater intensity. Their position, intensity, width at half intensity (also called half width), and the relative intensities of the rest of the Raman bands with respect to the Raman band having a greater intensity (relative intensity) were then calculated. In the present Example 6, Raman spectrum deconvolution was calculated with the mathematical tools of the data representation program, Origin, through iterative processes.

FIG. 14 shows the Raman signals deconvoluted in the Raman shift region between 1000 and 2250 cm$^{-1}$ for different samples. The result of the deconvolution for sample S38 (milled glassy material) shows an envelope signal formed by three Raman bands the half width of which are characterized by having values greater than 90 cm$^{-1}$ (FIG. 14a and Table 6).

TABLE 6

Characteristics of the deconvoluted Raman peaks/bands of sample S38 in the range between 1000 and 2250 cm$^{-1}$

|  | Position (cm$^{-1}$) | Intensity (cps) | Width (cm$^{-1}$) | Relative intensity |
|---|---|---|---|---|
| Peak 1 | 1368.3 | 14163 | 90.1 | 1 |
| Peak 2 | 1438.3 | 9336 | 166.8 | 0.66 |
| Peak 3 | 1907.5 | 1870 | 184.8 | 0.13 |

The deconvolution of the Raman signal of sample S11 which comprises an albite crystalline phase embedded in a glassy phase (FIG. 14b) exhibited 5 bands, wherein 4 of them (Table 7) exhibited half widths less than 90 cm$^{-1}$, with two of them furthermore being less than 20 cm$^{-1}$. The existence of crystalline phases embedded in a glassy phase in sample S11 gives rise to a narrowing of the deconvoluted bands with respect to the bands corresponding to a glassy material (FIG. 14a).

TABLE 7

Deconvoluted peaks of sample S11 in the range between 1000 and 2250 cm$^{-1}$

|  | Position (cm$^{-1}$) | Intensity (cps) | Width (cm$^{-1}$) | Relative intensity |
|---|---|---|---|---|
| Peak 3 | 1259.2 | 2400 | 13.0 | 0.12 |
| Peak 4 | 1343.1 | 8566 | 83.2 | 0.42 |
| Peak 5 | 1380.4 | 20275 | 18.9 | 1.00 |
| Peak 6 | 1524.6 | 2933 | 51.2 | 0.14 |
| Peak 7 | 1685.5 | 1583 | 222.3 | 0.08 |

Similarly, the Raman spectra of samples S1 (FIG. 14c and Table 8), S4 (FIG. 14d and Table 9), S35 (FIG. 14e and Table 10), and S36 in the (FIG. 14f and Table 11) were deconvoluted. It was observed that the deconvoluted Raman spectra exhibit at least two Raman peaks with a half width less than 90 cm$^{-1}$ for samples S1, S4, S35, and S36.

Furthermore, the deconvoluted Raman spectra of said samples show at least one of the following characteristics: three or more than three deconvoluted Raman peaks; two or more deconvoluted peaks with a difference in the Raman shift value of ≥0.5 cm$^{-1}$ between the two peaks closest to one another in terms of Raman shift value; or two or more differences in peak relative intensity values.

The present experiment allows demonstrating that the Raman signal in the Raman shift range between 1000 and 2250 cm$^{-1}$ can be differentiated for different samples by means of deconvoluting said signal. Therefore, each security marker has a unique deconvoluted Raman peak/band pattern in the Raman shift range between 1000 and 2250 cm$^{-1}$. This band pattern can be modulated by modifying the composition, the thermal treatment, and the subsequent treatment followed to obtain the security markers of the present invention.

Based on the analysis of the set of deconvoluted Raman peaks in the Raman shift range between 1000 and 2250 cm$^{-1}$, an alphanumerical value can be defined by means of ad hoc algorithms which allows establishing a unique key for each marker for the purpose of digitizing said marker in computing means. An advantage is thereby obtained with respect to other markers in the state of the art as digitization of a security marker corresponding to spectra which do not correspond with vibrational modes of the structure of the material is enabled.

TABLE 8

Deconvoluted peaks of sample S1 in the range between 1000 and 2250 $cm^{-1}$

|  | Position ($cm^{-1}$) | Intensity (cps) | Width ($cm^{-1}$) | Relative intensity |
|---|---|---|---|---|
| Peak 8 | 1237.9 | 3802.0 | 19.8 | 0.19 |
| Peak 9 | 1293.3 | 12570.0 | 32.0 | 0.64 |
| Peak 10 | 1315.1 | 11161.0 | 21.0 | 0.57 |
| Peak 11 | 1349.1 | 19624.0 | 28.4 | 1.00 |
| Peak 12 | 1416.0 | 17126.0 | 22.1 | 0.07 |
| Peak 13 | 1477.2 | 9871.0 | 33.3 | 0.50 |
| Peak 14 | 1616.1 | 8164.0 | 46.0 | 0.42 |
| Peak 15 | 1675.6 | 4756.0 | 111.1 | 0.24 |

TABLE 9

Deconvoluted peaks of sample S4 in the range between 1000 and 2250 $cm^{-1}$

|  | Position ($cm^{-1}$) | Intensity (cps) | Width ($cm^{-1}$) | Relative intensity |
|---|---|---|---|---|
| Peak 15 | 1295.6 | 7570 | 62.0 | 0.77 |
| Peak 16 | 1356.0 | 9778 | 41.7 | 1.00 |
| Peak 17 | 1413.0 | 9400 | 41.5 | 0.96 |
| Peak 18 | 1480.6 | 4216 | 56.4 | 0.43 |
| Peak 19 | 1624.3 | 2415 | 90.9 | 0.25 |
| Peak 20 | 1693.4 | 1867 | 86.0 | 0.19 |

TABLE 10

Deconvoluted peaks of sample S35 in the range between 1000 and 2250 $cm^{-1}$

|  | Position ($cm^{-1}$) | Intensity (cps) | Width ($cm^{-1}$) | Relative intensity |
|---|---|---|---|---|
| Peak 21 | 1272.5 | 34621 | 32.9 | 1.00 |
| Peak 22 | 1337.5 | 6005 | 27.1 | 0.17 |
| Peak 23 | 1383.3 | 5919 | 53.9 | 0.17 |
| Peak 24 | 1437.4 | 3225 | 28.0 | 0.09 |
| Peak 25 | 1501.4 | 16986 | 31.2 | 0.49 |
| Peak 26 | 1568.4 | 2295 | 71.9 | 0.07 |
| Peak 27 | 1718.5 | 953 | 49.2 | 0.03 |
| Peak 28 | 1732.7 | 2641 | 32.4 | 0.08 |
| Peak 29 | 1796.5 | 6222 | 35.2 | 0.18 |

TABLE 11

Deconvoluted peaks of sample S36 in the range between 1000 and 2250 $cm^{-1}$

|  | Position ($cm^{-1}$) | Intensity (cps) | Width ($cm^{-1}$) | Relative intensity |
|---|---|---|---|---|
| Peak 30 | 1272.9 | 41770 | 32.0 | 1.00 |
| Peak 31 | 1338.5 | 11770 | 32.7 | 0.28 |
| Peak 32 | 1384.3 | 10959 | 43.4 | 0.26 |
| Peak 33 | 1432.4 | 1518 | 9.4 | 0.04 |
| Peak 34 | 1502.1 | 20909 | 26.1 | 0.50 |
| Peak 35 | 1557.9 | 4720 | 54.7 | 0.11 |
| Peak 36 | 1718.3 | 1820 | 40.3 | 0.04 |
| Peak 37 | 1734.8 | 4115 | 25.8 | 0.10 |
| Peak 38 | 1796.0 | 7097 | 30.7 | 0.17 |

Sample Characterization

The samples of the preceding examples were characterized as follows by means of different techniques known in the art.

The samples prepared by means of spark plasma sintering (SPS) were prepared with DR. SINTER SPS-1050-C equipment at 900 and 1000° C. for times between 10 minutes and 2 hours and at pressures of 50 MPa.

The Raman spectra of the samples of the present invention were measured between 100 and 2500 $cm^{-1}$. Said spectra were measured using a red laser with a wavelength of 785 nm and B&W Tek, Inc brand i-Raman equipment at power percentages comprised between 7 and 90% of the equipment's maximum power (350 mW) for integration times comprised between 0.5 and 10 s.

X-ray diffraction measurements were taken with a Bruker AXS D8 Advance diffractometer (λ radiation=1.5418 Å) in Bragg-Brentano configuration with 2θ values between 20-60°, measurement step of 0.05°, and integration times of 1 s.

Field emission scanning electron microscopy measurements were taken with Hitachi S-4700 equipment working at 20 Kv. The samples were metallographically polished and chemically etched by means of a 5% acidic HF solution for intervals of 2-5 seconds and then washed with distilled water. Said samples were observed in solid state.

Milling operations were performed in attrition mills or a SPEX SamplePrep LLC high-energy ball mill 8000D mixer mill model in 20-minute long milling operations. A Fritsch Pulverisette 6 model high-energy planetary mill was also used, working at 300 rpm.

X-ray fluorescence measurements were taken in the form of "beads" prepared by means of melting 0.3000 g of sample and 5.5 g of $Li_2B_4O_7$ in PANalytical MagicX equipment (PW-2424).

The chemical composition of some of the samples is expressed in % by weight of equivalent oxides once losses on ignition were deducted.

The $d_{50}$ value is calculated from the median of the particle diameter distribution obtained from measurements of a significant sample of particles (for example, more than 50 particles) by means of different known techniques, for example, microscopy or granulometric techniques. The average particle size was determined by means of laser granulometry using MALVER MARTERSIZE equipment.

Example 7. Example of the Incorporation of the Security Marker in Security Labels by Means of Printing This example was carried out using a silk-screen printing machine manufactured by Stork, a silk screen manufactured by Stork, paper having a natural cellulose-based fibrous composition manufactured in a round paper machine, ink containing the security marker (S4) incorporated in an aqueous medium to obtain a suspension of dispersed particles of the security marker with a solid content of 40% by weight.

The main characteristics of the indicated installations and materials are described in detail below:
Conditions of the Printing Machine
  Drying tunnel temperature: 145° C.
  Machine speed: 70 m/min
  Suction speed: 2500 rpm
  Blowing speed: 2400 rpm
  Residual moisture of the paper after drying: 6.5%

Conditions of the Silk Screen:
  Reference: RSI900
  Development: 25⅜"
  Mesh: 105
  Open area: 15%
  Thickness: 105 micra
  Width: 910 mm
Conditions of the Ink:
  Commercial name of the ink: WB RAMAN 50/50 R-47236 silk-screen printing ink
  Commercial name of the cross-linker: P/IRIDESCENT R-27877 additive
  Viscosity of the ink after adding cross-linker: 20 s CP4
  Viscosity of the ink for printing: 18 s CP4
Main Conditions of the Paper:
  Fibrous composition: 100% cotton cellulose
  Grammage: 90 g/m$^2$
  Thickness: 115 micra
  Bendtsen smoothness on the felt side: <700 ml/min
  Bendtsen smoothness on the fabric side: <800 ml/min
  Bendtsen porosity: 20-40 ml/min
  Bendtsen porosity after creasing: <140 ml/min
  Cobb value: 40-70 g/cm$^2$
  Ash: <5%
  Opacity: 84%
Embodiment Method Once the printing machine was started up to reach the established machine conditions, the silk screen placed, the reel of paper placed on the unwinding shaft, and the web of paper distributed in the machine circuit, the ink was mixed with the crosslinker at a proportion of 1.5% by weight of the latter with respect to the former, under gentle stirring conditions in the same 20 kg ink drum. Once the perfect dispersion of the components was assured, the content of the drum was pumped to the inkwell of the printing machine and the paper was positioned on the silk screen, starting the printing of the ink through the holes of the screen according to the graphic design established therein on one of the sides, controlling the final moisture of the paper, the viscosity of the ink, and the machine conditions throughout the entire printing process.

FIG. 15 shows the Raman spectrum obtained from the printed sample.

Example 8. Use of the Security Marker in Self-Adhesive Security Label Paper Coating This example is carried out using an air knife coating machine which is supplied with a coating slip previously prepared according to the following formula particularly indicated for use of the coated paper in offset printing techniques for self-adhesive security labels:
  Mineral fillers: 80% calcium carbonate (Ref Albacar HO Slurry manufactured by Specialty Minerals) and 20% kaolin (reference Supragloss 95 manufactured by Imerys) to obtain 50 parts of the slip
  Synthetic binder: 10 parts butadiene styrene latex (reference Styronal D-517 manufactured by BASF)
  Synthetic co-binder: 2 parts (reference Acronal 700 L manufactured by BASF)
  Thickener: 1 part carboxymethyl cellulose
  Insolubilizing agent: 1 part (reference Basocoll OV manufactured by BASF)
  Additives: 1 part sodium hydroxide
  Aqueous dispersion of a representative sample of the security marker (S4) incorporated in an aqueous medium to obtain a suspension of dispersed particles of the security marker with a solid content of 40% by weight: 1 part
  Water: The rest up to 100 parts.

The self-adhesive paper used for coating has the following characteristics:
  Total grammage: 200 g/m$^2$
  Grammage of siliconized support: 82 g/m$^2$
  Grammage of adhesive: 20 g/m$^2$
  Fibrous composition of the front side: 100% cellulose from mechanical pulp
Conditions of the Coating Machine:
  Drying tunnel temperature: 145° C.
  Machine speed: 150 m/min
  Residual moisture of the paper after drying: 6.5%
Characteristics of the Coated Paper:
  Total grammage: 220 g/m$^2$
  Grammage of the coated layer: 20 g/m$^2$
  Bekk smoothness on the coated side: 200 sec
  Ash: 20%
  Opacity: 84%
Embodiment Method Once the coating machine was started up to reach the established machine conditions, the reel of paper placed on the unwinding shaft, and the web of paper distributed in the machine circuit, the coating slip is metered into the tray of the air knife coater and the coating process is started according to the established machine conditions until finishing the reel. After the coating process, the reel of paper is calendered until reaching the established smoothness and cut to the format required for the subsequent process for sheet or reel printing of the security labels.

Example 9. Use of the Security Marker Applied Randomly within the Mass of the Security Paper for Printing Passports This example was carried out using a round paper machine and an aqueous dispersion of cellulose fibers suitably bleached and refined in previous production processes which, along with different chemical products such as antifoaming agents, charge retention agents, color fixing agents, mineral fillers such as titanium dioxide or alumina silicate, pigment dyes, ion and pH regulators, and dry resistance resins such as carboxymethyl cellulose (all of them added in specific amounts depending on the characteristics of the paper to be manufactured, which amounts are not mentioned as they are not relevant to the properties to be achieved with the security markers), confirmed the base pulp for manufacturing paper with a consistency or concentration around 3% by weight with respect to the amount of water used with a pH between 7 and 8.

The aqueous solution of the security marker (S4) described in Examples 7 and 8 was also prepared in a 1000 kg dilution tank. The marker was metered into the machine head ink. The polyamide-epichlorohydrin-based wet resistance resin was then added to the paper pulp. From the machine head ink, this entire mass of cellulose fibers and chemical additives subsequently reached the round shape wherein there was formed the layer of paper forming the final sheet of paper after the pressing, drying, gluing, and subsequent drying and calendering processes. The paper manufactured by these means was then used for printing passports.

The main characteristics of the paper produced in these conditions were:
Grammage: 87.2 g/m²
Thickness: 102 micra
Bendtsen porosity: 14 ml/min
Whiteness: 75.3%
Opacity: 90.6%

Example 10. Use of the Security Marker Applied for Proper Positioning within the Mass of Security Paper for Printing Passports This example is carried out using a round paper machine and an aqueous dispersion of cellulose fibers suitably bleached and refined in previous production processes which, along with different chemical products such as antifoaming agents, charge retention agents, color fixing agents, mineral fillers such as titanium dioxide or alumina silicate, pigment dyes, ion and pH regulators, and dry resistance resins such as carboxymethyl cellulose (all of them added in specific amounts depending on the characteristics of the paper to be manufactured, which amounts are not mentioned as they are not relevant to the properties to be achieved with the security markers), confirm the base pulp for manufacturing paper with a consistency or concentration around 3% by weight with respect to the amount of water used with a pH between 7 and 8. The aqueous solution of the security marker (S4) described in Examples 7 and 8 is also placed in a 50 kg dilution tank mixed with a red pigment dye (Carmin Levanyl GZ supplied by BASF) to facilitate visually checking that the marker has been properly positioned in its location. The marker is metered through a P-Jet metering valve positioned in the sheet formation area of the paper machine at the point wherein the two sheets making up the paper substrate will be joined together. The polyamide-epichlorohydrin-based wet resistance resin is then added to the paper pulp. From the machine head ink, this entire mass of cellulose fibers and chemical additives subsequently reach the round shape wherein there is formed the layer of paper forming the final sheet of paper after the pressing, drying, gluing, and subsequent drying and calendering processes.

The metering valve regulation conditions are:
Nozzle diameter: 400 micra
Frequency: 50 Hz
Pulse: 2 ms
Working pressure: 5.95 bar
Pressure of the material: 1.77 bar The main characteristics of the paper produced in these conditions are:
Grammage: 87.02 g/m²
Thickness: 104 micra
Ash: 4.71%

Example 11. Use of the Security Marker Applied on the Surface of the Security Paper for Printing Passports This example is carried out using a round paper machine and an aqueous dispersion of cellulose fibers suitably bleached and refined in previous production processes which, along with different chemical products such as antifoaming agents, charge retention agents, color fixing agents, mineral fillers such as titanium dioxide or alumina silicate, pigment dyes, ion and pH regulators, and dry resistance resins such as carboxymethyl cellulose (all of them added in specific amounts depending on the characteristics of the paper to be manufactured, which amounts are not mentioned as they are not relevant to the properties to be achieved with the security markers), confirm the base pulp for manufacturing paper with a consistency or concentration around 3% by weight with respect to the amount of water used with a pH between 7 and 8.

There is then added to the paper pulp the polyamide-epichlorohydrin-based wet resistance resin which is also strongly cationic and has the possibility of forming covalent bonds with cellulose fibers and with itself to form the polymer lattice required to give the paper the wet resistance level that is specified.

From the machine head ink, this entire mass of cellulose fibers and chemical additives subsequently reach the round shape where the layer of paper is formed after the pressing and drying processes.

After drying, the paper will move to the gluing area where it will be immersed in a tray that will contain a dilution of polyvinyl alcohol-based gluing agents (reference Airvol 103 manufactured by Air Products & Chemical) where 100 ml of an aqueous solution of a representative sample (S4) of the security marker incorporated in an aqueous medium will have been added for every 100 liters of gluing agent for obtaining a suspension of dispersed particles of the security marker with a solid content of 5% by weight.

The paper is the dried and calendered until obtaining an absolute moisture of the paper of 5%. The paper manufactured by these means is then used for printing passports.

Example 12. Use of the Security Marker within the Mass of Security Fibers for its Inclusion within the Mass of Security Paper This example was carried out using a plastic material extrusion machine made up of a metering hopper with a circular section where the chips of polymer material were metered, a piston meter where a representative sample of the security marker (S4) was metered at 0.1% to 4% by weight with respect to the total weight of the polymer, a single screw extruder with a Maddock type mixer and a spinning head, an air cooling system, a fiber tempering or tensing system, and a cutter. The main process parameters in use and the configuration parameters of this machine are indicated below.

Configuration of the Screw of the Extruder:
  Screw diameter: 5 cm
  Screw length in the feeding area: 50 cm
  Screw length in the compression area: 30 cm
  Screw length in the metering area: 20 cm
  Angle of the blades: 17.65°
  Thread pitch: 5 cm
  Gap between cylinder and screw: 0.5 cm
  Depth of the metering channel: 0.25 cm
  Depth of the feeding channel: 0.75 cm
  Outer diameter of the cylinder: 7.01 cm
  Inner diameter of the cylinder: 5.01 cm
  Length of the mixer: 10 cm
  Number of holes of the spinning head: 50
  Diameter of the holes: 0.15 mm
Process Parameters of the Extruder:
  Range of temperatures along the cylinder: 120-185°
  Fiber flow rate at the outlet of the spinning head: 10 l/h
  Output speed: 18.3 m/s (7.5 kg of fiber/hour)
  Pressure: 70 bar
  Cooling area: 1.8 m Characteristics of the Polymer Material:
 Composition: polypropylene manufactured by LyonDell-Basell (ref.: HM560R)
 Chip density: 0.91 g/cm$^3$
 Melting temperature: 145° C.
 Melt flow index: 25 g/10 min (230° C./2.16 kg)
Characteristics of the Security Fibers:
 Thickness: 0.02 mm
 Length 3 mm
Embodiment Method:

Once the extrusion machine was started up in the indicated configuration and with the indicated process parameters, coat to reach the established machine conditions, polypropylene chips were fed into the heated hopper. The security markers were introduced by means of using a vertical piston meter located between the feeding area and the compression area of the extruder. The material was gradually mixed and pressed as it moved along the screw, starting with an atmospheric pressure in the hopper and increasing until the outlet through the nozzle. Before reaching the mixer, the components passed through a mesh or filter. After going through the mixer, the material is subjected to maximum pressure and passes through a spinning head or spinnerette provided with small circular perforations where continuous threads were produced.

Once the threads were obtained, they were cooled by means of an air current and then collected by a drive roller feeding the tensing unit. In this unit, the threads align their crystalline structure in the direction of the axis of the filament, enabling their elongation which will be caused by the action of a roller located the end of the drying chamber and rotating at a speed 4 times greater than that of the outlet of the spinning head.

Another roller then drove the threads to the cutting machine where a set of stationary knives cut the threads to the specific length: between 3 and 3.4 mm, generating the final fibers.

The Raman spectrum of the polypropylene fibers with the described security marker was measured for the described samples (not shown).

Example 13. Use of the Security Marker Applied in Polymer Substrate Silk-Screen Printing Ink for ID Cards This example is carried out using a silk-screen printing machine jointly manufactured by Stork and Thieme with ultraviolet drying, a Rotaplate silk screen manufactured by Stork, a polyester-based polymer substrate, silk screen printing ink manufactured by Arzubialde, and an aqueous solution of a representative sample of the security marker (S4) incorporated in an aqueous medium to obtain a suspension of dispersed particles of the security marker with a solid content of 40% by weight.

The main characteristics of the indicated installations and materials are described in detail below:
Conditions of the Printing Machine on Each Side of the Paper:
 Machine speed: 4000 sheets/hour
 Drying conditions: 60%
Conditions of the Rotaplate Silk Screen: 125 W
 Mesh: 125 hpi
 Thickness: 120 micra
 Open area: 43%
 Diameter: 140 micra Conditions of the Iridescent Ink and Additives:
 Commercial name of the ink: WB RAMAN 50/50 R-47236 silk screen printing ink
 Viscosity of the ink for printing: 120 s CP4
Main Conditions of the Polymer Substrate:
 Composition: polyester manufactured by PPG Industries (Ref.: Teslin SP 1000)
 Thickness: 200 micra
Embodiment Method:

Once the printing machine is started up to reach the established machine conditions, the silk screen placed, and those of polyester positioned, a mixture of silk screen printing ink, to which 100 ml of the aqueous solution of the security marker described in preceding examples (Examples 7 and 8) will have been previously added, will be pumped into the inkwell. Printing of the ink through the holes of the screen according to the graphic design established therein on one of the sides then begins, controlling the viscosity of the ink and the machine conditions throughout the entire printing process.

Example 14. Use of Security Markers Applied in the Coated Layer of Paper for Printing Postage Stamps This example was carried out using a filmpress coating machine which is supplied with a coating slip previously prepared according to the following formula such that the type and characteristics of the coating obtained is particularly indicated for use of the coated paper in gravure printing techniques for postage stamps.
 Synthetic binder: 12 parts butadiene styrene latex (reference L-8000 manufactured by EOC Polymers)
 Synthetic co-binder: 2 parts (reference Acronal 700 L manufactured by BASF)
 Thickener: 1 part carboxymethyl cellulose
 Insolubilizing agent: 1 part (reference Basocoll OV manufactured by BASF)
 Additives: 1 part sodium hydroxide
 Aqueous solution of the security marker described above (Examples 7 and 8): 1 part
 Water: The rest up to 100 parts.
The support paper used for coating has the following characteristics:
 Total grammage: 90 g/m$^2$
 Thickness: 120 micra
 Fibrous composition: 100% cellulose from mechanical pulp
Conditions of the Coating Machine:
 Drying tunnel temperature: 150° C.
 Machine speed: 170 m/min
 Residual moisture of the paper after drying: 5.5%
Characteristics of the Coated Paper:
 Total grammage: 110 g/m$^2$
 Grammage of the coated layer: 20 g/m$^2$
 Bekk smoothness on the coated side: 1800 sec
 Ash: 15%
 Opacity: 80%
Embodiment Method:

Once the coating machine has been started up to reach the established machine conditions, the reel of paper placed on the unwinding shaft, and the web of paper distributed in the machine circuit, the coating slip is metered into the feeding tray of the cylinders in contact with the paper and the coating process is started according to the established machine conditions until finishing the reel.

After the coating process, the reel of paper is calendered so as to reach the established smoothness and cut to the format required for the subsequent process for sheet or reel printing of postage stamps. FIG. 16 shows the Raman spectrum obtained for the coated paper without the marker of the present invention (a) and with the marker of the present invention, wherein said marker is located in the coated layer (b). As can be seen in FIG. 16b, the Raman spectrum of the coated paper comprising the marker of the invention has significant Raman signals in the Raman shift range between 1000 and 2250 cm$^{-1}$. The possibility of detecting the Raman signal relative to the marker of the present invention once said marker is incorporated in a security article, element, or document, in this case a coated layer of paper, was thereby proven.

Example 15. Use of the Security Marker Applied in the Gummed Layer of Paper for Printing Gummed Tax Stamps or Security Labels This example is carried out using a filmpress coating machine which is supplied with a previously conditioned re-wettable gum composition which is particularly indicated for use of gummed paper for offset printing techniques for gummed tax stamps or security labels.

The re-wettable gum composition used is based on polyvinyl acetate, with reference A-4524 manufactured by Henkel Adhesives & Technologies being used. One liter of an aqueous solution of the security marker (S4) described above (Examples 7 and 8) and 1400 grams of green food dye with reference Verde Carta DAM Líquido manufactured by Clariant previously prepared by means of mixing 1 part of the indicated dye with 3 parts water are added for each 1000 kg tank of gum composition.

The support paper used for gumming has the following characteristics:
Total grammage: 95 g/m$^2$
Thickness: 98 micra
Fibrous composition: 100% cellulose from mechanical pulp
Conditions of the Coating Machine:
Drying tunnel temperature: 130° C.
Machine speed: 140 m/min
Residual moisture of the paper after drying: 5.5%
Characteristics of the Gummed Paper:
Total grammage: 105 g/m$^2$
Grammage of the coated layer: 10 g/m$^2$
Re-wettable gum adhesion: 25 gF/mm
Ash: 10%
Opacity: 80%
Embodiment Method:
Once the coating machine used for applying the re-wettable gum has been started up to reach the established machine conditions, the reel of paper placed on the unwinding shaft, and the web of paper distributed in the machine circuit, the gum slip is metered into the feeding tray of the cylinders in contact with the paper and the gumming process is started according to the established machine conditions until finishing the reel.

After the gumming process, the reel of paper is cut to the format required for the subsequent process for sheet or reel printing of gummed tax stamps or security labels.

Example 16. Use of the Security Marker Applied on the Surface of Cellulose Strips for Insertion within the Mass of the Security Paper for Printing Banknotes of Legal Tender This example is carried out using a gravure printing machine manufactured by Giave, a gravure cylinder manufactured by Artcyl and etched by Ziraba, paper having a natural cellulose-based fibrous composition manufactured by Miguel y Costas, gravure printing ink manufactured by Arzubialde, and an aqueous solution of the security marker (S4) described above in Examples 7 and 8, among others.

The main characteristics of the indicated installations and materials are described in detail below:
Conditions of the Printing Machine on Each Side of the Paper:
Drying tunnel temperature: 45° C.
Machine speed: 80 m/min
Reel tension: 150 N
Heliofun (antistatic system): 60%
Conditions of the Gravure Cylinder
Type of etching: chemical
Lineature: 90 line/cm
Cell depth: 34 micra
Table: 510 mm
Diameter: 24"=194.02 mm
Conditions of the Ink:
Commercial name of the ink: WB RAMAN 50/50 R-47236
Viscosity of the ink: 32 s CP4
Viscosity of the varnish for application: 32 s CP4
Main Conditions of the Paper:
Fibrous composition: 100% cellulose
Grammage: 18 g/m$^2$
Thickness: 30 micra
Bendtsen porosity: 144 ml/min
Opacity: 25%
Embodiment Method:
Once the printing machine has been started up to reach the established machine conditions, the gravure cylinder placed, the reel of paper placed on the unwinding shaft, and the web of paper distributed in the machine circuit, the ink is mixed with 100 ml of the aqueous solution of the security marker. Once the perfect dispersion of the components has been assured, the content of the drum is pumped to the inkwell of the printing machine. The paper is positioned on the printing cylinder, starting the printing of the ink on the paper on one of the sides, controlling the final moisture of the paper, the viscosity of the ink, and the machine conditions throughout the entire printing process. After the end of the process, the reel is left at rest for a minimum maturation time of 24 hours at room temperature (23° C. and 50% RH).

The invention claimed is:
1. A security marker comprising:
a glassy matrix comprising at least the elements silicon and oxygen; and
a first crystalline phase formed by crystalline particles embedded in said matrix; wherein said particles are feldspars or feldspathoids; wherein the average size of said crystalline particles is less than 500 nm; and
wherein an interface exists between the crystalline particles and the glassy matrix; and
wherein the crystalline particles consist of aggregates or agglomerates of nanoparticles,
wherein said nanoparticles have an average size between 1 and 50 nm; and
wherein the crystalline particles of the first crystalline phase are formed by a material selected from the group consisting of orthoclase, sanidine, microcline, anorthoclase, albite, oligoclase, andesine, labradorite, banalsite, bytownite, anorthite, leucite, nepheline, analcime, cancrinite, hauyne, lazurite, nosean, sodalite, and combinations thereof; and
wherein the security marker is in a powder state.

2. The security marker according to claim 1, wherein the glassy matrix of the security marker further comprises at least one element or a combination of elements from the group consisting of Na, K, Ca, Fe, Ti, Zn, Al B, Ba, Mg, Sr, and Cs.

3. The security marker according to claim 1, wherein the crystalline particles of the first crystalline phase are formed by a material selected from the group consisting of orthoclase, sanidine, microcline, anorthoclase, albite, oligoclase, andesine, labradorite, banalsite, bytownite, anorthite, leucite, nepheline, analcime, cancrinite, and combinations thereof.

4. The security marker according to claim 1, comprising a second crystalline phase; and optionally wherein the security marker comprises a third crystalline phase which is an inorganic pigment.

5. The security marker according to claim 4, wherein the second crystalline phase comprises cerium oxide, europium oxide, or a mixture of both; and wherein the second crystalline phase of the present invention is in the form of crystalline particles with an average size greater than 500 nm.

6. The security marker according to claim 1, wherein the average size of the particles of the first crystalline phase is less than 400 nm.

7. The security marker according to claim 1, wherein an amount of the first crystalline phase is in between 5 and 10 wt %.

8. The security marker according to claim 1, wherein the crystalline particles comprise silicon and aluminum in a proportion of 3:1 to 1:1.

9. The security marker according to claim 1, wherein the security marker is formed by particles with diameters of less than 20 μm.

10. A method of preparing the security marker defined in claim 1, comprising the steps of:
   i. providing a mixture comprising:
      a. a source of silicon and oxygen;
      b. a source of aluminum;
      c. a source of at least one element selected from the group consisting of Na, K, and Ca,
      wherein said sources (a, b, and c) come from the same material or from different materials;
   ii. optionally performing a mechanical treatment on the mixture of step (i) to yield a mixture; and
   iii. performing a thermal treatment at a temperature comprised between 500° C. and 1500° C. for a period of time between 0.1 min and 50 h on the mixture of (i) or (ii); and optionally, wherein the mixture of step (i) further comprises a lanthanide or rare earth source.

11. A security article, comprising
the security marker defined in claim 1.

12. The security article according to claim 11, wherein said security article is selected from bank cards, passports, tickets for the lottery, currency, and commemorative medals and optionally wherein the security marker is immobilized in said security article.

13. A security document comprising the security marker as defined in claim 1.

14. The security document according to claim 13, wherein said security document is selected from security paper, identification documents, banknotes, checks, stamps, stamp-impressed paper, labels, and tickets; and optionally wherein the security marker is immobilized in said security document.

15. A security element comprising the security marker as defined in claim 1.

16. The security element according to claim 15, wherein said security element is selected from security paper, security threads, security fibers, security inks, watermarks, tactile effects, cellulose strips, layers of glues, lacquers, patches, planchettes, holograms, pigments or substances of security, plastic sheets, and polymer substrates; and optionally wherein the security marker is immobilized in said security element.

17. An object of value comprising the security marker as defined in claim 1, wherein an object of value is selected from jewels, works of art, medicinal products, clothing, leather articles, historical objects, antiquities, rare books, electronic components, limited edition objects, collector items and vehicle spare parts and optionally wherein the security marker is immobilized in said object of value.

18. A method of preparing a security article, security document, security element or object of value comprising the security marker as defined in claim 1, said method comprising the incorporation of the security marker; wherein said incorporation is performed:
   while manufacturing the material used for making the security article, security document, security element or the object of value
   as part of an additive added to the security article, security document, security element or the object of value; or
   on the surface of said security article, security document, security element or said object of value.

19. A method for determining the authenticity of a security article, security document, security element or object of value, comprising the security marker as defined in claim 1, wherein said method comprises
   i. irradiating the security article, security document, security element or the object of value with monochromatic laser radiation with a wavelength between 600 and 1100 nm; and
   ii. measuring the Raman spectrum of said security article, security document, security element or of the object of value to determine the presence of the security marker; and
   iii. verifying if the Raman spectrum of said security article, security document, security element or said object of value comprises a signal in the Raman shift range of 1000-2250 $cm^{-1}$ of the Raman spectrum;
   iv. deconvoluting the signal in the Raman shift range of 1000-2250 $cm^{-1}$ of the Raman spectrum; and
   v. verifying if the deconvoluted Raman signal in the Raman shift range of 1000-2250 $cm^{-1}$ of the Raman spectrum comprises at least two Raman bands the width of which at half intensity is less than 90 $cm^{-1}$; and optionally, wherein it is verified if the signal in the Raman shift range of 1000-2250 $cm^{-1}$ of the Raman spectrum has an intensity value which is at least 0.5 times greater than the intensity value of the most intense Raman signal obtained in the Raman shift range of 100 to 1000 $cm^{-1}$.

* * * * *